US012700118B2

(12) United States Patent　　(10) Patent No.:　US 12,700,118 B2
Bleicher et al.　　　　　　　　　　(45) Date of Patent:　　*Aug. 4, 2026

(54) SYSTEMS AND METHODS FOR PROCESSING CAPTURED IMAGES

(71) Applicant: NIKE, Inc., Beaverton, OR (US)

(72) Inventors: David Alexander Bleicher, Tel-Aviv (IL); Dror Ben-Eliezer, Pardes Hanna-Karkur (IL); Shachar Iian, Givatayim (IL); Tamir Lousky, Ramat Gan (IL); Natanel Davidovits, Tel-Aviv (IL); Daniel Mashala, Tel-Aviv (IL); Eli Baram, Hod Hasharon (IL); Yossi Elkrief, Be'er Sheva (IL); Ofir Ron, Rishon LeZion (IL)

(73) Assignee: NIKE, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/232,519

(22) Filed: Aug. 10, 2023

(65) Prior Publication Data

US 2023/0386065 A1　　Nov. 30, 2023

Related U.S. Application Data

(63) Continuation of application No. 17/333,938, filed on May 28, 2021, now Pat. No. 11,776,147.
(Continued)

(51) Int. Cl.
*G06T 7/60*　　(2017.01)
*G01C 5/00*　　(2006.01)
(Continued)

(52) U.S. Cl.
CPC .................. *G06T 7/60* (2013.01); *G01C 5/00* (2013.01); *G01S 17/08* (2013.01); *G06N 5/04* (2013.01);
(Continued)

(58) Field of Classification Search
CPC ........ G06V 20/62; G06V 40/20; G06V 10/26; G06V 2201/12; G06T 2207/10028;
(Continued)

(56) References Cited

U.S. PATENT DOCUMENTS 4,473,373 A　　9/1984　Weiss
5,164,793 A　　11/1992　Wolfersberger et al.
(Continued)

FOREIGN PATENT DOCUMENTS

CN　　101707946 A　　5/2010
CN　　101742048 A　　6/2010
(Continued)

OTHER PUBLICATIONS

Ph. Guerlain, et al., "Digitizing and measuring of the human body for the clothing industry," International Journal of Clothing Science and Technology, vol. 18, No. 3, 2006, pp. 151-165, doi:http://dx.doi.org/10.1108/09556220610657925 (Year: 2006).
(Continued)

*Primary Examiner* — Xiao M Wu
*Assistant Examiner* — Scott E Sonners
(74) *Attorney, Agent, or Firm* — Banner & Witcoff, Ltd.

(57)　　　ABSTRACT

Systems, methods, and apparatuses described herein may provide image processing, including displaying, by a mobile device, an image of an object located perpendicular to a reference object, calculating, based on at least one depth measurement determined using a depth sensor in the mobile device, the predicted height of the mobile device when the image was captured, calculating scale data for the image based on the predicted height, determining a reference line identifying the location of the object and the reference object in the image, segmenting pixels in the object in the image from pixels in the image outside the object, measuring the object based on the pixels in the object and the scale data,
(Continued)

and generating model data comprising the object, the scale data, and the measurements.

20 Claims, 16 Drawing Sheets

Related U.S. Application Data

(60) Provisional application No. 63/045,431, filed on Jun. 29, 2020, provisional application No. 63/031,885, filed on May 29, 2020.

(51) Int. Cl.

| | |
|---|---|
| *G01S 17/08* | (2006.01) |
| *G06N 5/04* | (2023.01) |
| *G06N 20/00* | (2019.01) |
| *G06Q 30/0601* | (2023.01) |
| *G06T 7/11* | (2017.01) |
| *G06T 7/13* | (2017.01) |
| *G06T 7/194* | (2017.01) |
| *G06T 7/50* | (2017.01) |
| *G06T 7/521* | (2017.01) |
| *G06T 7/62* | (2017.01) |
| *G06T 7/73* | (2017.01) |
| *G06T 17/20* | (2006.01) |
| *H04N 23/60* | (2023.01) |

(52) U.S. Cl.
CPC ......... *G06N 20/00* (2019.01); *G06Q 30/0631* (2013.01); *G06Q 30/0643* (2013.01); *G06T 7/11* (2017.01); *G06T 7/13* (2017.01); *G06T 7/194* (2017.01); *G06T 7/50* (2017.01); *G06T 7/521* (2017.01); *G06T 7/62* (2017.01); *G06T 7/73* (2017.01); *G06T 17/20* (2013.01); *H04N 23/64* (2023.01); *G06T 2207/20081* (2013.01); *G06T 2207/30196* (2013.01)

(58) Field of Classification Search
CPC ......... G06T 2207/10016; G06T 15/205; G06T 17/20; G06T 7/20; G06T 7/593; G06T 19/20; G06T 2215/16; G06T 2207/30196; G06T 7/11; G06T 19/006; G06T 2200/04; G06T 2200/08; G06T 2207/20081; G06T 7/246; G06T 7/70; G06T 2200/24; G06T 3/40; G06T 7/33; G06T 7/50; G06T 1/0007; G06T 17/00; G06T 7/194; G06T 7/571; G06T 7/73; G06T 2200/16; G06F 3/011; G06F 3/0346
See application file for complete search history.

(56) References Cited

U.S. PATENT DOCUMENTS

| | | | |
|---|---|---|---|
| 5,689,446 | A | 11/1997 | Sundman et al. |
| 6,289,107 | B1 | 9/2001 | Borchers et al. |
| 6,546,356 | B1 | 4/2003 | Genest |
| 8,065,200 | B2 | 11/2011 | Schwartz |
| 8,567,081 | B2 | 10/2013 | Smith |
| 8,655,053 | B1 | 2/2014 | Hansen |
| 8,818,883 | B2 | 8/2014 | Lawrence et al. |
| 8,868,157 | B1 | 10/2014 | Soliz |
| 8,908,928 | B1 | 12/2014 | Hansen |
| 9,098,908 | B2 | 8/2015 | Kirk et al. |
| 9,345,957 | B2 | 5/2016 | Geisner et al. |
| 9,386,889 | B2 | 7/2016 | Fischer |
| 9,449,343 | B2 | 9/2016 | Mayerle et al. |
| 9,462,838 | B1 | 10/2016 | Smith et al. |
| 9,477,980 | B2 | 10/2016 | Zagel et al. |
| 9,594,967 | B2 | 3/2017 | Chuang et al. |
| 9,648,926 | B2 | 5/2017 | Marks |
| 9,799,064 | B2 | 10/2017 | Ohnemus et al. |
| 9,875,546 | B1 | 1/2018 | Bhole et al. |
| 9,996,981 | B1 | 6/2018 | Tran et al. |
| 10,008,040 | B2 | 6/2018 | Lam et al. |
| 10,013,803 | B2 | 7/2018 | Mach Shepherd et al. |
| 10,067,500 | B2 | 9/2018 | Hargovan et al. |
| 10,380,794 | B2 | 8/2019 | Hauswiesner et al. |
| 10,420,397 | B2 | 9/2019 | Hei et al. |
| 10,573,004 | B2 | 2/2020 | Husheer |
| 10,755,431 | B2 | 8/2020 | Shea et al. |
| 11,324,285 | B2 | 5/2022 | Hei et al. |
| 11,514,673 | B2 | 11/2022 | Lehrich et al. |
| 11,805,861 | B2 | 11/2023 | Hei et al. |
| 2002/0138170 | A1 | 9/2002 | Onyshkevych et al. |
| 2002/0140694 | A1 | 10/2002 | Sauer et al. |
| 2003/0195623 | A1 | 10/2003 | Marchitto et al. |
| 2004/0081336 | A1 | 4/2004 | Brooks |
| 2006/0004592 | A1 | 1/2006 | Faith |
| 2006/0104503 | A1 | 5/2006 | Huang et al. |
| 2007/0005174 | A1 | 1/2007 | Thomas |
| 2007/0056212 | A1 | 3/2007 | Fink |
| 2008/0040278 | A1 | 2/2008 | DeWitt |
| 2008/0047164 | A1 | 2/2008 | Vindriis |
| 2009/0051683 | A1 | 2/2009 | Goonetilleke et al. |
| 2009/0247909 | A1 | 10/2009 | Mukumoto |
| 2009/0287452 | A1 | 11/2009 | Stanley et al. |
| 2010/0111370 | A1 | 5/2010 | Black et al. |
| 2010/0296726 | A1 | 11/2010 | Rutschmann et al. |
| 2011/0047046 | A1 | 2/2011 | Torres |
| 2011/0093344 | A1 | 4/2011 | Burke et al. |
| 2011/0298897 | A1 | 12/2011 | Sareen et al. |
| 2012/0054041 | A1 | 3/2012 | Williams |
| 2012/0085828 | A1 | 4/2012 | Ziegler |
| 2012/0106796 | A1 | 5/2012 | Jones et al. |
| 2012/0249741 | A1 | 10/2012 | Maciocci et al. |
| 2012/0287122 | A1 | 11/2012 | Nadar et al. |
| 2012/0303154 | A1 | 11/2012 | Stiernagle |
| 2013/0080289 | A1 | 3/2013 | Roy et al. |
| 2013/0095924 | A1 | 4/2013 | Geisner et al. |
| 2013/0100256 | A1 | 4/2013 | Kirk et al. |
| 2013/0110666 | A1 | 5/2013 | Aubrey |
| 2013/0114869 | A1 | 5/2013 | Hernandez Stark et al. |
| 2013/0215116 | A1 | 8/2013 | Siddique et al. |
| 2013/0218721 | A1 | 8/2013 | Borhan et al. |
| 2013/0246222 | A1 | 9/2013 | Weerasinghe |
| 2013/0307851 | A1 | 11/2013 | Hernandez Stark et al. |
| 2014/0035913 | A1 | 2/2014 | Higgins et al. |
| 2014/0040041 | A1 | 2/2014 | Ohnemus et al. |
| 2014/0089134 | A1 | 3/2014 | Linh et al. |
| 2014/0104395 | A1 | 4/2014 | Rohaly et al. |
| 2014/0108208 | A1 | 4/2014 | Piana |
| 2014/0149072 | A1 | 5/2014 | Rutschmann |
| 2014/0156449 | A1 | 6/2014 | Ganesan et al. |
| 2014/0176565 | A1 | 6/2014 | Adeyoola et al. |
| 2014/0180864 | A1 | 6/2014 | Orlov et al. |
| 2014/0244442 | A1 | 8/2014 | Hirsch |
| 2014/0270540 | A1 | 9/2014 | Spector et al. |
| 2014/0285646 | A1 | 9/2014 | Kahlon |
| 2014/0320529 | A1 | 10/2014 | Roberts et al. |
| 2014/0337138 | A1 | 11/2014 | Chitalia et al. |
| 2014/0358738 | A1 | 12/2014 | Ohnemus et al. |
| 2015/0012380 | A1 | 1/2015 | Bank et al. |
| 2015/0039422 | A1 | 2/2015 | Abraham et al. |
| 2015/0066707 | A1 | 3/2015 | Unger et al. |
| 2015/0066712 | A1 | 3/2015 | Altieri |
| 2015/0070351 | A1 | 3/2015 | Tarquini et al. |
| 2015/0127132 | A1 | 5/2015 | Nyong'o et al. |
| 2015/0127363 | A1 | 5/2015 | Nyong'o et al. |
| 2015/0133754 | A1 | 5/2015 | Freeman et al. |
| 2015/0154453 | A1 | 6/2015 | Wilf |
| 2015/0199816 | A1 | 7/2015 | Freeman et al. |
| 2015/0223730 | A1 | 8/2015 | Ferrantelli |
| 2015/0228084 | A1 | 8/2015 | Belyaev et al. |
| 2015/0258431 | A1 | 9/2015 | Stafford et al. |
| 2015/0278155 | A1 | 10/2015 | Myers et al. |
| 2015/0328016 | A1 | 11/2015 | Summit et al. |
| 2015/0339752 | A1 | 11/2015 | Chetuparambil et al. |
| 2015/0342266 | A1 | 12/2015 | Cooper et al. |

(56) References Cited

U.S. PATENT DOCUMENTS

| | | |
|---|---|---|
| 2015/0359461 A1 | 12/2015 | Alfaro et al. |
| 2016/0012611 A1 | 1/2016 | Wexler et al. |
| 2016/0042315 A1 | 2/2016 | Field-Darragh et al. |
| 2016/0063613 A1 | 3/2016 | Zhao et al. |
| 2016/0071143 A1 | 3/2016 | Pokorney et al. |
| 2016/0081435 A1 | 3/2016 | Marks |
| 2016/0093085 A1 | 3/2016 | Ray et al. |
| 2016/0110479 A1 | 4/2016 | Li |
| 2016/0125499 A1 | 5/2016 | Gooch et al. |
| 2016/0140553 A1 | 5/2016 | Faith et al. |
| 2016/0180391 A1 | 6/2016 | Zabaneh |
| 2016/0183879 A1 | 6/2016 | Goldish et al. |
| 2016/0235158 A1 | 8/2016 | DesJardins et al. |
| 2016/0247017 A1 | 8/2016 | Sareen et al. |
| 2016/0286906 A1 | 10/2016 | Malal et al. |
| 2016/0350833 A1 | 12/2016 | Andon |
| 2016/0367191 A1 | 12/2016 | Esposito et al. |
| 2017/0004568 A1 | 1/2017 | Radner |
| 2017/0027477 A1 | 2/2017 | Charles et al. |
| 2017/0056212 A1 | 3/2017 | Jonsson et al. |
| 2017/0061683 A1 | 3/2017 | Dorin et al. |
| 2017/0076011 A1 | 3/2017 | Gannon |
| 2017/0083971 A1 | 3/2017 | Ray et al. |
| 2017/0169571 A1 | 6/2017 | Hung et al. |
| 2017/0208245 A1 | 7/2017 | Castillo et al. |
| 2017/0272728 A1 | 9/2017 | Rafii et al. |
| 2017/0323299 A1 | 11/2017 | Davis |
| 2018/0033202 A1 | 2/2018 | Lam et al. |
| 2018/0035762 A1 | 2/2018 | Towns et al. |
| 2018/0047200 A1 | 2/2018 | O'Hara et al. |
| 2018/0160776 A1 | 6/2018 | Hei et al. |
| 2018/0160777 A1* | 6/2018 | Hei ........................ A61B 5/0022 |
| 2018/0182091 A1 | 6/2018 | MacKinnon et al. |
| 2018/0218437 A1 | 8/2018 | Rusu et al. |
| 2018/0240238 A1 | 8/2018 | Husheer |
| 2018/0247426 A1 | 8/2018 | Gluck et al. |
| 2018/0300445 A1 | 10/2018 | Schouwenburg et al. |
| 2018/0300791 A1 | 10/2018 | Ganesan et al. |
| 2019/0026954 A1 | 1/2019 | Vats |
| 2019/0028637 A1 | 1/2019 | Kolesov et al. |
| 2019/0037134 A1 | 1/2019 | Merati |
| 2019/0082794 A1 | 3/2019 | Liu |
| 2019/0130788 A1 | 5/2019 | Seaton |
| 2019/0139252 A1 | 5/2019 | Zaiss et al. |
| 2019/0188784 A1 | 6/2019 | Bleicher et al. |
| 2019/0385356 A1 | 12/2019 | Lodato et al. |
| 2020/0151896 A1* | 5/2020 | Shea ......................... G06T 7/50 |
| 2020/0211170 A1* | 7/2020 | Coria Mendoza ..... H04N 23/64 |
| 2020/0311429 A1 | 10/2020 | Chen |
| 2021/0093050 A1 | 4/2021 | Lee et al. |
| 2022/0183424 A1 | 6/2022 | Nevala et al. |
| 2022/0202138 A1 | 6/2022 | Hei et al. |
| 2024/0115009 A1 | 4/2024 | Hei et al. |

FOREIGN PATENT DOCUMENTS

| | | |
|---|---|---|
| CN | 101819663 A | 9/2010 |
| CN | 201831042 U | 5/2011 |
| CN | 102200437 A | 9/2011 |
| CN | 102466472 A | 5/2012 |
| CN | 102682395 A | 9/2012 |
| CN | 103093543 A | 5/2013 |
| CN | 103597519 A | 2/2014 |
| CN | 103852130 A | 6/2014 |
| CN | 104040580 A | 9/2014 |
| CN | 104170519 A | 11/2014 |
| CN | 104699908 A | 6/2015 |
| CN | 104854623 A | 8/2015 |
| CN | 106372374 A | 2/2017 |
| CN | 106659259 A | 5/2017 |
| CN | 106901445 A | 6/2017 |
| CN | 106942837 A | 7/2017 |
| CN | 110662484 A | 1/2020 |
| IN | 105662681 A | 6/2016 |
| JP | H06149376 A | 5/1994 |
| JP | 2000515088 A | 11/2000 |
| JP | 2001101272 A | 4/2001 |
| JP | 2002203167 A | 7/2002 |
| JP | 2003127994 A | 5/2003 |
| JP | 2003331108 A | 11/2003 |
| JP | 2005006905 A | 1/2005 |
| JP | 2005169015 A | 6/2005 |
| JP | 2006053147 A | 2/2006 |
| JP | 2007526028 A | 9/2007 |
| JP | 2007-267996 A | 10/2007 |
| JP | 2010510587 A | 4/2010 |
| JP | 2011-036869 A | 2/2011 |
| JP | 2013050937 A | 3/2013 |
| JP | 2013077314 A | 4/2013 |
| JP | 2013097799 A | 5/2013 |
| JP | 2014040231 A | 3/2014 |
| JP | 2016001360 A | 1/2016 |
| JP | 2016040649 A | 3/2016 |
| JP | 2016532197 A | 10/2016 |
| JP | 2017016356 A | 1/2017 |
| JP | 201779809 A | 5/2017 |
| JP | 2018526641 A | 9/2018 |
| JP | 2019049457 A | 3/2019 |
| JP | 2019056679 A | 4/2019 |
| KR | 200342176 Y1 | 2/2004 |
| KR | 20100019067 A | 2/2010 |
| KR | 20100131404 A | 12/2010 |
| KR | 20110131404 A | 12/2011 |
| KR | 20120123842 A | 11/2012 |
| KR | 20120123845 A | 11/2012 |
| KR | 20130052159 A | 5/2013 |
| KR | 20140123977 A | 10/2014 |
| KR | 20150061089 A | 6/2015 |
| KR | 20150070459 A | 6/2015 |
| KR | 20150119979 A | 10/2015 |
| KR | 20160005977 A | 1/2016 |
| KR | 20160021118 A | 2/2016 |
| TW | 201251444 A | 12/2012 |
| WO | 9748027 A1 | 12/1997 |
| WO | 2005006905 A1 | 1/2005 |
| WO | 2012072844 A1 | 6/2012 |
| WO | 2013026798 A1 | 2/2013 |
| WO | 2014159726 A1 | 10/2014 |
| WO | 2015127418 A1 | 8/2015 |
| WO | 2016051416 A1 | 4/2016 |
| WO | 2017127132 A1 | 7/2017 |
| WO | 2017220638 A1 | 12/2017 |
| WO | 2018048902 A1 | 3/2018 |
| WO | 2018109421 A1 | 6/2018 |

OTHER PUBLICATIONS

Oct. 1, 2018—(WO) ISR & WO—App. No. PCT/US18/039781.
Jul. 9, 2019—(WO) ISR & WO—App. No. PCT/US19/014958.
Nov. 16, 2017—(WO) ISR & WO—App. No. PCT/US17/050281.
May 24, 2018—(WO) ISR & WO—App. No. PCT/IB18/050041.
Sep. 21, 2021—(WO) ISR & WO—App. No. PCT/US21/034932.
Anonymous: "How to Calculate Height of Android Phone from ground—Stack Overflow". Aug. 17, 2017 (Aug. 17, 2017), XP055836361, Retreived from the Internet: URL:https://stackoverflow.com/questions/17443936/how-to-calculate-height-of-android-phone-from-ground [retreived on Aug. 31, 2021].
Geometrix announces unique web 3D virtual try-on solution. (Oct. 23, 2000). PR Newswire Retrieved from https://dialog.proquest.com/professional/docview/444318359?accountid=161862 (Year: 2000).
Heat map definition, Google (Year: NA).
A brief history of GPS, Mark Sullivan, 2012 (Year: 2012).
Dec. 4, 2017 (WO) International Search Report—PCT/US2017/43373, 12 pages.
"Accu Foot size", Accu foot size app review, Retrieved from the internet <URL https://www.apkmonk.com/app/com.accufootsize/>, 20157, 7 pages.
Mar. 29, 2018 (WO) International Search Report received for PCT Patent Application No. PCT/US2017/065878, 16 pages.
Nov. 19, 2018 (JP) Office Action received for Japanese Patent Application No. 2018-502047, 4 pages (Official Copy only)(See Communication under 37 CFR §v1.98(a)(3)).

(56) References Cited

OTHER PUBLICATIONS

Ganesan, Anand, "Footwear Virtual Fitting Service for E-Commerce & Physical Stores", findmeashoe.com, Jul. 2018, 27 pages.
Jun. 27, 2018 (WO) International Preliminary Report on Patentability received for PCT Patent Application No. PCT/US2017/065878, 13 pages.
Jun. 27, 2019 (WO) International Preliminary Report on Patentability received for PCT Patent Application No. PCT/US2017/065878, 13 pages.
Dec. 4, 2017 (WO) International Search Report—PCT/US17/43373, 12 pages.
Xu, et al. "A personalized assistant in 3D virtual shopping environment," 2010 Second International Conference on Intelligent Human-Machine Systems and Cybernetics, vol. 2, IEEE, 2010, 4 pages.
Schmeil, Andreas, et al., "MARA—A Mobile Augmented Reality-Based Virtual Assistant," Mar. 10, 2007, IEEE Virtual Reality Conference (Year: 2007).
Schmeil, Andreas, et al., "MARA—A Mobile Augmented Reality-Based Virtual Assistant," Mar. 10, 2007, IEEE Virtual Reality Conference (Year: 2007), 4 pages.
Schmeil, Andreas, et al., "MARA—A Mobile Augmented Reality-Based Virtual Assistant," Mar. 10, 2007, IEEE Virtual Reality Conference (Year: 2007), pp. 267-270, 4 pages.
Brykman, Steven, "Get Ready! The Humanoid AR Assistants Are Coming," Oct. 18, 2017, medium.com: Interactive Mind (Year: 2017), 7 pages.
Yang, Yu-I, et al., "A virtual try-on system in augmented reality using RGB-D cameras for footwear personalization," Oct. 2014, Journal of Manufacturing Systems vol. 33, Issue 4 (Year: 2014), 9 pages.
Merriam-Webster Dictionary definitions of "augmented reality," "superimpose," & "real time," as referenced in Response to Arguments, retrieved from merriam-webster.com via Internet Archive, dated 2013-2014 (Year: 2014).
M. Yuan, et al., "A Mixed Reality Virtual Clothes Try-On System," in IEEE Transactions on Multimedia, vol. 15, No. 8, pp. 1958-1968, Dec. 2013, doi: 10.1109/TMM.2013.2280560 (Year: 2013).
Kabir, et al., Review Paper, "Mobile Apps for Foot Measurement: A Scoping Review," arXiv e-prints, Sep. 2020 (Year: 2020), 25 pages.
Dec. 4, 2017 (WO) International Search Report—PCT/US2017/043373 , 12 pages.
"GPA gait posture assessment", <<https://blog.naver.com/doveman/220777337061>>, Aug. 2, 2016, 14 pages.
Domina, Tanya, et al., "Thermal pattern variations analyzed using 2D/3D mapping techniques among females," Journal of Textile and Apparel, Technology and Management 7.1. (Year 2011).
Kimura, Takato, et al., "Automatic Crack Detection in Infrastructure Inspection Using Fully Convolutional Network," received Aug. 27, 2017, vol. 11, No. 1, 12-20 (Mar. 2018), 2018 Information Processing Society of Japan, 10 pages.
Zhaohui Zheng, Method and System for Shopping using a Computing Device, ip.com, Apr. 29, 2011, 3 pages.
O'Connor, Clare, "Meet the 25-Year-Old Swedish Woman Using 3D Scanning to Make Shoes Fit Perfectly," Entrepreneurs, Jan. 20, 2016, 5 pages.
Matsuki, Junya, et al., "Shoes Recommendation System Based on Clustering of 3D Shoes Data," 2018 International Workshop on Advanced Image Technology (IWAIT), IEEE, 2018, 4 pages.
SrirangamSridharan S., et al., "Object Localization and Size Estimation from RGB-D Images," Aug. 2, 2017; 5 pages.
Gao Ruipeng, et al., "Fast and Resilient Indoor Floor Plan Construction with a Single User," IEEE Transactions on Mobile Computing, vol. 18, No. 5, May 2019, 15 pages.

* cited by examiner

350

START

310 — Present User Interface

312 — Generate Image Data

314 — Move Device to Reference Surface

316 — Predict Height

318 — Determine Image Scale

320 — Generate Model Data

FINISH

500

START

510 — Obtain Image Data and Metadata

512 — Clean Metadata

514 — Calculate Predicted Height

516 — Refine Height using Machine Learning

518 — Determine Success Metric

520 — Calculate Scale Data for Image

FINISH

| Parameter | Units | Description |
|---|---|---|
| *_length | mm | Bounding box length |
| *_width | mm | Bounding box width |
| *_ball_length | mm | Length at the ball point |
| *_ball_width | mm | width at the ball point |
| *_diagonal_width | mm | width of the line between the ball point and the M5 point |
| *_ball_height | mm | Length at the widest cross section line of the foot |
| *_m5_height | mm | Height at the 5th Metatarsal estimate (outermost point on foot contour) |
| *_contour_area | px² | Area of the foot's safe contour (55% of foot length, marked in blue in diagram above) |
| *_contour_Perimeter | px | Perimeter of the foot's safe contour |
| *_contour_boundingbox_area | px² | Bounding box area of the foot's safe contour |
| *_toebox_area | px² | Area of the toe-box contour (25% of foot's length, marked in brown in diagram above) |
| *_toebox_Perimeter | px | Perimeter of the toe-box contour |
| *_toebox_boundingbox_area | px² | Bounding box area of the toe-box contour |

FIG. 7E

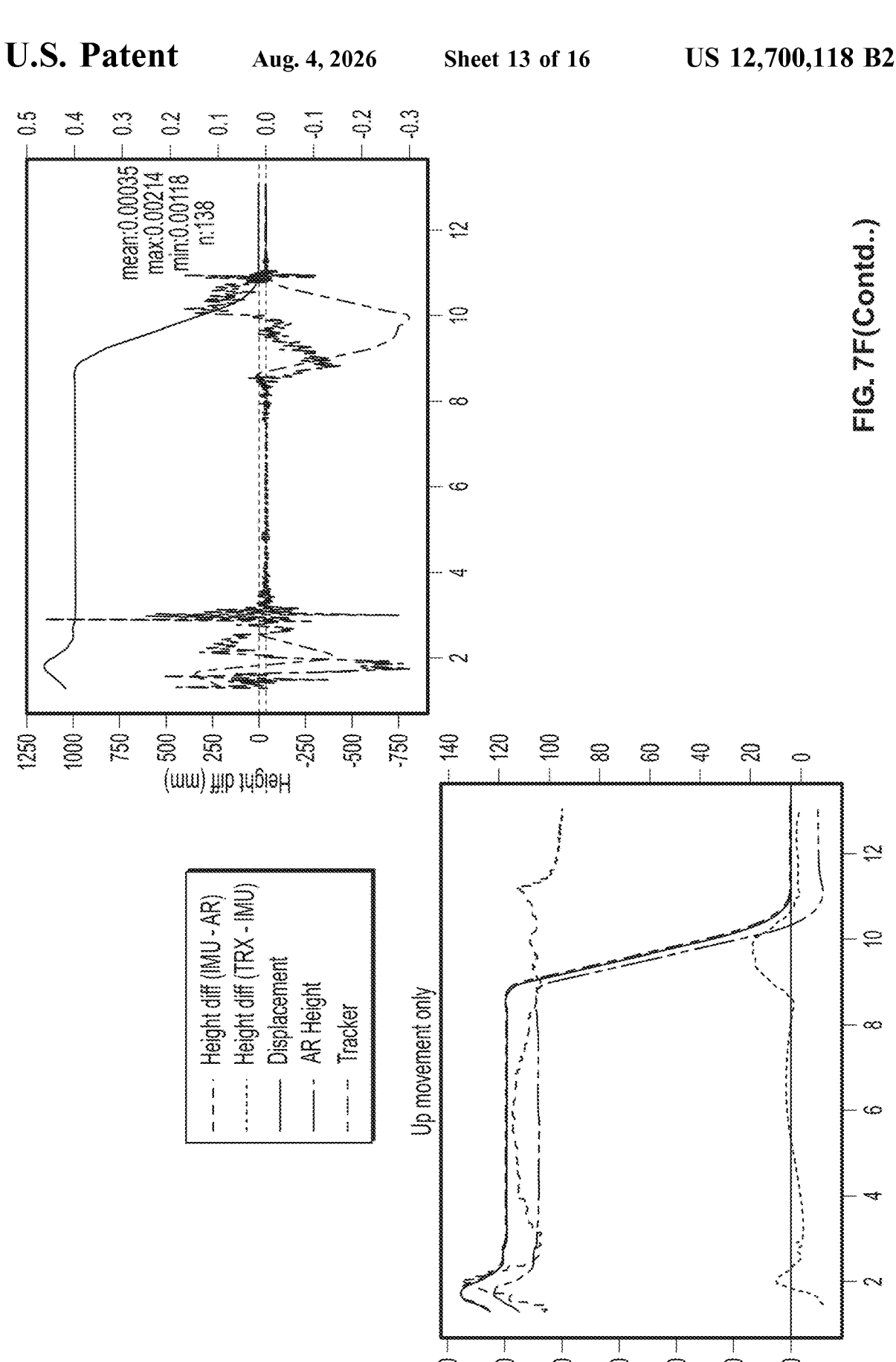
FIG. 7F(Contd..)

FIG. 7G

SYSTEMS AND METHODS FOR PROCESSING CAPTURED IMAGES

CROSS-REFERENCE TO RELATED APPLICATIONS

This application is a continuation application of U.S. patent application Ser. No. 17/333,938, filed May 28, 2021, which claims priority benefits based on U.S. Provisional Patent Application No. 63/031,885, filed May 29, 2020, and U.S. Provisional Patent Application No. 63/045,431, filed Jun. 29, 2020, each of which are incorporated by reference herein in their entirety.

TECHNICAL FIELD

The present invention relates in general to image processing and more specifically to processing images based on the device capturing the image.

BACKGROUND

A great majority of shoe shopping today still takes place in real brick and mortar shops. Most customers are familiar with the limitations of conventional shopping, as are the shop managers and assistants. In general, customers are dependent on shopping assistants to direct them towards products, location of in-stock products, assistance on trying on products, etc. Further, the typical brick and mortar (and online in some cases) shopping experience needs to be repeated every time a customer visits the same or a different shop, leading to inefficiency and user frustration.

SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

It would be highly advantageous to have a system or method that provides highly accurate and user-friendly automated or semi-automated apparel and footwear fitting solutions, both online and in store. There is provided, in accordance with embodiments of the present invention, apparatuses, systems, and methods to provide personalized online product fitting. In order to measure an object, such as a part of a user's body, a user can capture one or more images of the object using a mobile device. A user interface can be provided on the mobile device to provide detailed instructions indicating a combination of physical movements and positioning of the mobile device relative to the object in the real world. For example, a set of instruction for capturing an image of the user's feet can include having the user take their shoes off, wear socks with good contrast, find a clear wall, place their heels against the wall such that their feet are parallel and straight, center the mobile device over their feet, level the mobile device by aligning alignment indicators on the mobile device, placing the mobile device on the ground, and picking up the mobile device. In a variety of embodiments, the user need not wear socks or can wear socks with low contrast to the wall and/or floor. By measuring the movement of the mobile device to the floor and during pick up, the height from which the image was taken and the movement graph of the mobile device during the way from the hand to the ground can be calculated. Based on this information, the scale of the image to a real world measurement can be determined, and the scale can be used to measure objects within the captured image. For example, the scale can be used to measure the size of the user's feet with millimeter precision. The measured size can be used for a variety of purposes, such as making product recommendations to the user and generating accurate digital models of the captured object(s).

The arrangements described can also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example and is not limited by the accompanying figures in which like reference numerals indicate similar elements and in which:

FIG. 7E is a table illustrating measured features of a foot in accordance with one or more aspects described herein;

FIGS. 7G-H are conceptual illustrations of a scale generated for an image in accordance with one or more aspects described herein.

DETAILED DESCRIPTION

Figure 1:
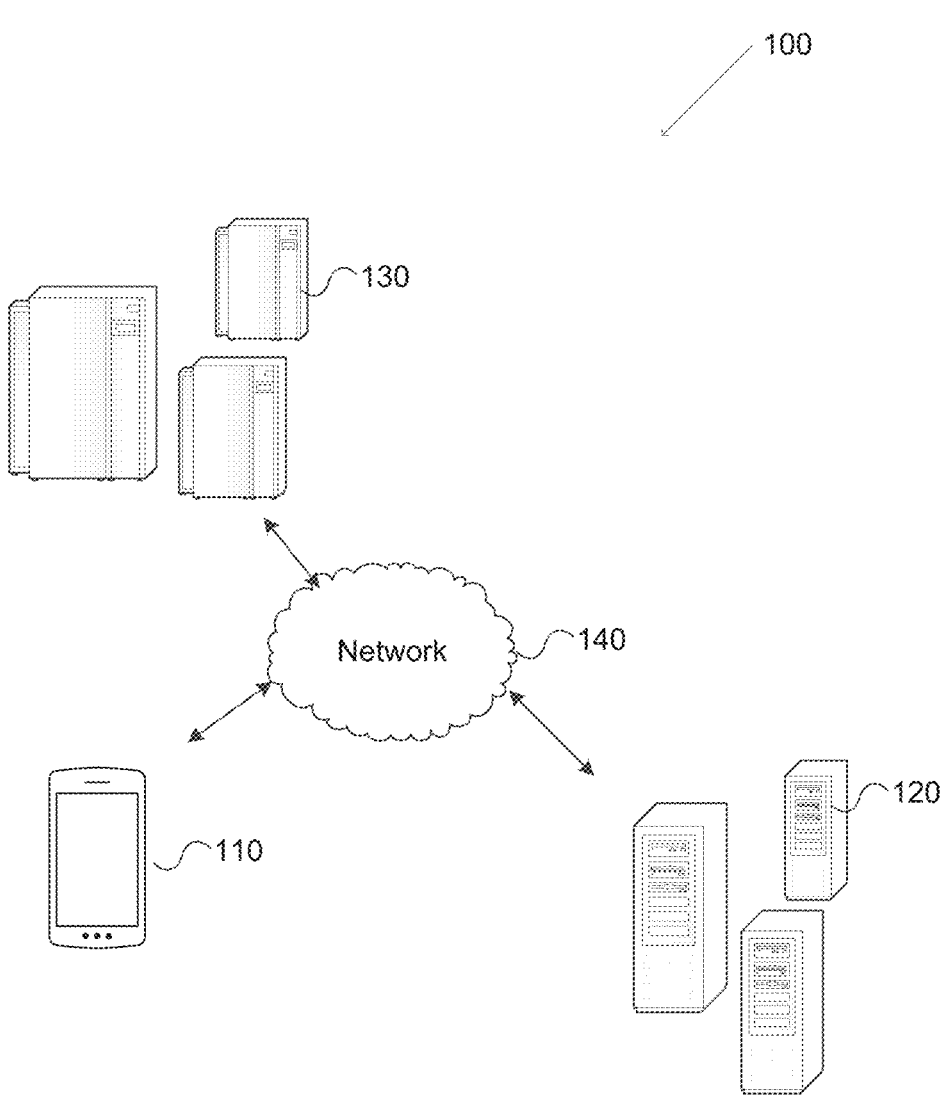
FIG. 1 illustrates an example operating environment in which one or more aspects described herein can be implemented.

The following description is presented to enable one of ordinary skill in the art to make and use the invention as provided in the context of a particular application and its requirements. Reference is made to the accompanying drawings, which form a part hereof, and in which is shown by way of illustration, various embodiments of the disclosure that can be practiced. It is to be understood that other embodiments can be utilized. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In other instances, well-known methods, procedures, and components have not been described in detail so as not to obscure the present invention.

Turning now to the drawings, systems and methods for capturing images and providing recommendations are disclosed. Apparel fitting and/or custom fabrication typically require measurements to be accurate to within one percent of the actual size of the object, while object detection in existing solutions can vary wildly, even when performing multiple measurements of the same object, and can be off by up to twenty percent. Images captured in accordance with aspects of the disclosure also capture a variety of metadata regarding the status of the computing device capturing the image that can be used to greatly increase the accuracy of object detection, scale determination, and object measurement as described herein. For example, object measurements performed in accordance with aspects of the disclosure are typically within 2 millimeters of the size of the actual object. The improved accuracy in the determination and measurement of objects allows for custom fabrication of apparel and/or footwear that consistently and accurately matches the user's body. In order to measure an object, such as a part of a user's body, a user can capture one or more images of the object using a mobile device. A user interface can be provided on the mobile device to provide detailed instructions indicating a combination of physical movements and positioning of the mobile device relative to the object in the real world. For example, a set of instruction for capturing an image of the user's feet can include having the user take their shoes off, wear socks with good contrast, find a clear wall, place their heels against the wall such that their feet are parallel and straight, center the mobile device over their feet, level the mobile device by aligning alignment indicators on the mobile device, placing the mobile device on the ground, and picking up the mobile device. In a variety of embodiments, the user need not wear socks or can wear socks with low contrast to the wall and/or floor. By measuring the movement of the mobile device to the floor and during pick up, the height from which the image was taken and the movement graph of the mobile device during the way from the hand to the ground can be calculated. In several embodiments, the height can be measured using one or more depth sensors in the mobile device, either alone or in combination with the height calculated during the movement of the mobile device. Based on this information, the scale of the image to a real world measurement can be determined, and the scale can be used to measure objects within the captured image. For example, the scale can be used to measure the size of the user's feet with millimeter precision. Additionally, the scale and/or measurement of the objects can be calculated based on data captured using the depth sensor, either alone or in combination with the determined scale. The measured size can be used for a variety of purposes, such as making product recommendations to the user and generating accurate digital models of the captured object(s).

A variety of systems and methods for measuring objects and providing recommendations are disclosed in U.S. Patent Publication Nos. 2019/0188784, 2019/0228448, and 2019/0347703. A variety of systems and methods for measuring objects using one or more reference planes are described in U.S. Pat. No. 10,420,397 and U.S. patent application Ser. No. 16/791,572. A variety of systems and methods for scanning objects, determining product fit, and providing recommendations are disclosed in U.S. Pat. Nos. 10,062,097, 10,282,773, 10,366,524, and 10,430,861 and U.S. patent application Ser. No. 16/552,414. The disclosures of each of these U.S. patents, patent Publications, and patent applications are hereby incorporated by reference in their entirety.

Operating Environments and Computing Devices

FIG. 1 illustrates an operating environment 100 in accordance with an embodiment of the invention. The operating environment 100 includes at least one mobile device 110, at least one processing server system 120, and/or at least one recommendation server system 130 in communication via a network 140. Any of the devices and systems described herein can be implemented, in whole or in part, using one or more computing systems described with respect to FIG. 2.

Mobile devices 110 can capture image data and metadata regarding the positioning of the mobile device 110 and/or provide and/or process the captured information as described herein. Processing server systems 120 can obtain image data and/or metadata, identify a variety of objects in the image data, and/or generate models of objects as described in more detail herein. Recommendation server systems 130 can generate a variety of recommendations based on models and/or preference data as described herein. However, it should be noted that any of the mobile devices 110, processing server systems 120, and/or recommendation server systems 130 can perform some or all of any step of any process as described herein. The network 140 can include a local area network (LAN), a wide area network (WAN), a wireless telecommunications network, and/or any other communication network or combination thereof.

As discussed herein, the data transferred to and from various devices in the operating environment 100 can include secure and sensitive data, such as confidential documents, developer profiles, and/or procedures for developing documents. Therefore, it can be desirable to protect transmissions of such data using secure network protocols and encryption, and/or to protect the integrity of the data when stored on the various computing devices within the document development system. For example, a file-based integration scheme or a service-based integration scheme can be utilized for transmitting data between the various computing devices. Data can be transmitted using various network communication protocols. Secure data transmission protocols and/or encryption can be used in file transfers to protect the integrity of the data, for example, File Transfer Protocol (FTP), Secure File Transfer Protocol (SFTP), and/or Pretty Good Privacy (PGP) encryption. In many embodiments, one or more web services can be implemented within the various computing devices. Web services can be accessed by authorized external devices and users to support input, extraction, and manipulation of data between the various computing devices in the operating environment 100. Web services built to support a personalized display system can be cross-domain and/or cross-platform, and can be built for enterprise use. Such web services can be developed in accordance with various web service standards, such as the Web Service Interoperability (WS-I) guidelines. Data can be transmitted using the Secure Sockets Layer (SSL) or Transport Layer Security (TLS) protocol to provide secure connections between the computing devices. Web services can be implemented using the WS-Security standard, which provides for secure SOAP messages using XML encryption. Specialized hardware can be used to provide secure web services. For example, secure network appliances can include built-in features such as hardware-accelerated SSL and HTTPS, WS-Security, and/or firewalls. Such specialized hardware can be installed and configured in the operating environment 100 in front of one or more computing devices such that any external devices can communicate directly with the specialized hardware.

It will be appreciated that the network connections shown are illustrative and other means of establishing a communications link between the computers can be used. The existence of any of various network protocols such as TCP/IP, Ethernet, FTP, HTTP and the like, and of various wireless communication technologies such as GSM, CDMA, WiFi, and WiMAX, is presumed, and the various computing devices described herein can be configured to communicate using any of these network protocols or technologies.

Figure 2:
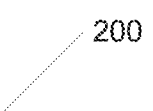
FIG. 2 illustrates an example computing device in accordance with one or more aspects described herein.
Figure 2:
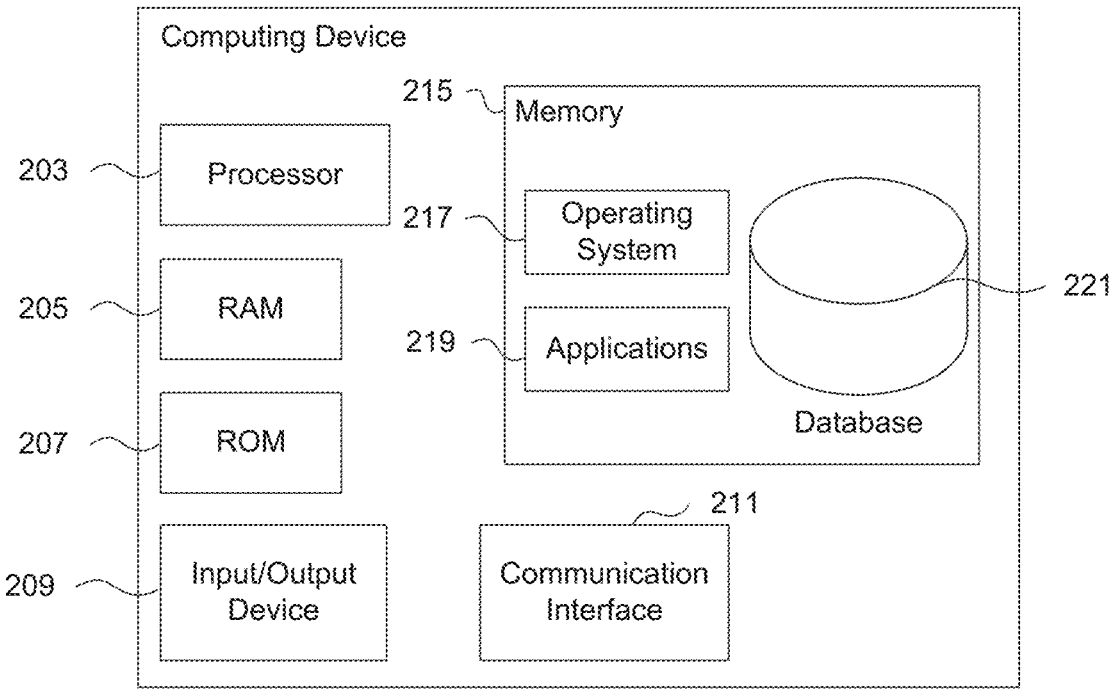

Turning now to FIG. 2, a computing device 200 in accordance with an embodiment of the invention is shown. The computing device 200 can include a processor 203 for controlling overall operation of the computing device 200 and its associated components, including RAM 205, ROM 207, input/output device 209, communication interface 211, and/or memory 215. A data bus can interconnect processor (s) 203, RAM 205, ROM 207, memory 215, I/O device 209, and/or communication interface 211. Communication interface 211 can include one or more transceivers, digital signal processors, and/or additional circuitry and software for communicating via any network, wired or wireless, using any protocol including those described herein.

Input/output (I/O) device 209 can include a microphone, keypad, touch screen, and/or stylus through which a user of the computing device 200 can provide input, and can also include one or more of a speaker for providing audio output and a video display device for providing textual, audiovisual, and/or graphical output. In many embodiments, the I/O devices 209 include one or more depth sensors and/or one or more image capture devices. The image capture devices can be used to capture images of a scene. The depth sensors can be used to determine depth in images captured using one or more image capture devices. Software can be stored within memory 215 to provide instructions to processor 203 allowing computing device 200 to perform various actions. For example, memory 215 can store software used by the computing device 200, such as an operating system 217, application programs 219, and/or an associated internal database 221. The various hardware memory units in memory 215 can include volatile and nonvolatile, removable and non-removable media implemented in any method or technology for storage of information such as computer-readable instructions, data structures, program modules, or other data. Memory 215 can include one or more physical persistent memory devices and/or one or more non-persistent memory devices. Memory 215 can include, but is not limited to, random access memory (RAM) 205, read only memory (ROM) 207, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 203.

Processor 203 can include a single central processing unit (CPU), which can be a single-core or multi-core processor (e.g., dual-core, quad-core, etc.), or can include multiple CPUs. Processor(s) 203 and associated components can allow the computing device 200 to execute a series of computer-readable instructions to perform some or all of the processes described herein. Although not shown in FIG. 2, various elements within memory 215 or other components in computing device 200, can include one or more caches, for example, CPU caches used by the processor 203, page caches used by the operating system 217, disk caches of a hard drive, and/or database caches used to cache content from database 221. For embodiments including a CPU cache, the CPU cache can be used by one or more processors 203 to reduce memory latency and access time. A processor 203 can retrieve data from or write data to the CPU cache rather than reading/writing to memory 215, which can improve the speed of these operations. In some examples, a database cache can be created in which certain data from a database 221 is cached in a separate smaller database in a memory separate from the database, such as in RAM 205 or on a separate computing device. For instance, in a multi-tiered application, a database cache on an application server can reduce data retrieval and data manipulation time by not needing to communicate over a network with a back-end database server. These types of caches and others can be included in various embodiments, and can provide potential advantages in certain implementations of document development systems, such as faster response times and less dependence on network conditions when transmitting and receiving data.

Although various components of computing device 200 are described separately, functionality of the various components can be combined and/or performed by a single component and/or multiple computing devices in communication without departing from the invention.

Overview

Images typically capture one or more objects that are the subject of the image. A variety of existing systems, such as the Apple ARKit, allow for the detection of objects within an image. However, the accuracy of the captured objects is less than optimal and it is difficult to determine an accurate scale for the image. Due to this lack of accuracy, these images are unsuitable for use in determining the size of the objects within the image with a level of accuracy needed for applications requiring a high level of accuracy. For example, footwear fitting and/or custom footwear fabrication typically require measurements to be accurate to within one percent of the actual size of the object, while object detection in ARKit can vary wildly, even when performing multiple measurements of the same object, and can be off by up to twenty percent. Images captured in accordance with aspects of the disclosure also capture a variety of metadata regarding the status of the computing device capturing the image, such as acceleration data and orientation data in multiple axes, that can be used to determine various properties of the environment in which the image was taken and the orientation of the computing device relative to the object being captured. This metadata can be used to greatly increase the accuracy of object detection, scale determination, and object measurement as described herein.

Figure 3A:
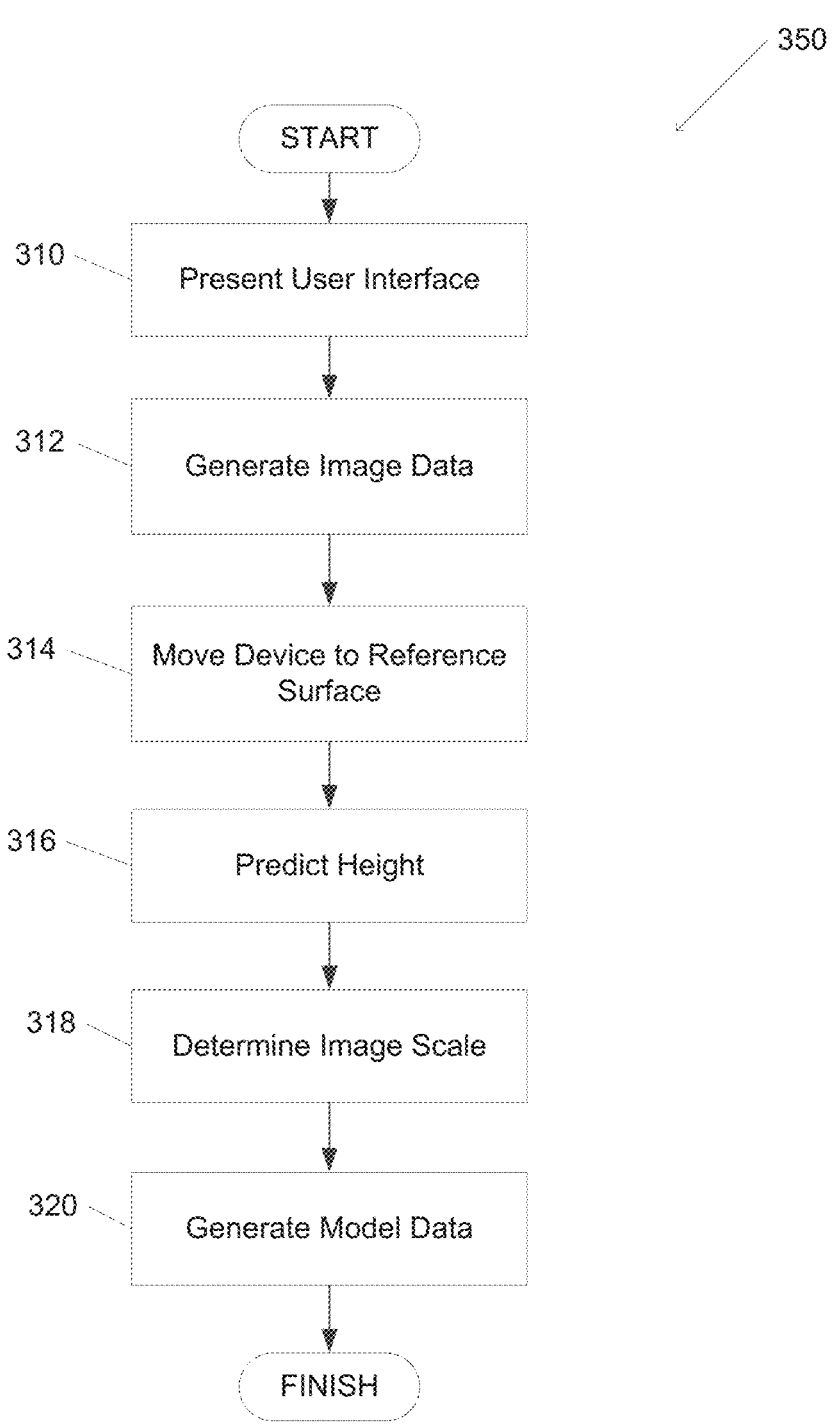
FIG. 3A is a flow chart conceptually illustrating a process for generating a model of an object in accordance with one or more aspects described herein.

FIG. 3A is a flow chart conceptually illustrating a process for generating a model of an object in accordance with one or more aspects described herein. Some or all of the steps of process 300 may be performed using one or more computing devices as described herein. In a variety of embodiments, some or all of the steps described below may be combined and/or divided into sub-steps as appropriate.

At step 310, a user interface can be presented. The user interface can provide detailed instruction the steps to capture image data and/or generate models. In many embodiments, the image capture process involves a combination of physical movements and positioning of a device in the real world together with regular "app type" on screen instructions, and that the results are affected from how well the positioning and movement of the device is performed. A variety of processes can be performed on the device to ensure that all appropriate conditions are satisfied before capturing an image of an object. For example, an inertial measurement sensor (such as a gyroscope or accelerometer) can be used to determine that the device is well balanced and at minimal angles relative to the object while the image is captured.

At step 312, image data can be generated. At step 314, a device can be moved to a reference surface. However, it should be noted that, particularly in embodiments using depth sensors, the device may not need to be moved to the reference surface.

At step 316, height data can be predicted. In several embodiments, the height data can be determined based on the motion of the device from the position from which the image was captured to the reference surface. In many embodiments, the height data can be determined using a depth sensor incorporated into the device. For example, a light detection and ranging (LIDAR) sensor can project one or more laser beams into the environment and determine the time between the projection of the laser beam and the detection of the laser beam as it is reflected back to the LIDAR sensor. The determined time can be used to calculate the distance traveled by the laser beam(s), and that distance can be translated in a height measurement from the device to a reference surface (such as the floor) or any of the objects located in the captured image. It should be noted that any depth sensor, including infrared depth sensors that project one or more infrared dots into the captured image, can be used to measure depth as appropriate. In a number of embodiments, multiple depth measurements can be measured using the depth sensor and the resulting depth measurements can be averaged to determine the height data.

At step 318, image scale data can be determined. The image data can be generated by capturing an image of one or more objects and/or one or more reference planes. After capture, the device can be moved to a reference surface. In several embodiments, the reference surface is captured in the image data. The inertial measurement sensor(s) can measure a variety of data during the motion of the device to the reference plane. During the movement, the height from which the image was taken and the movement graph of the phone during the way from the hand to the ground can be calculated based on the measured data with a high degree of accuracy. Additionally, the depth measurements can be used, either alone or in combination with the calculated height, to determine the height and/or image scale data. In many embodiments, a variety of data captured using the device and other processes can be performed during the time the phone is on the ground and picked up for results. At this stage in case, if there are abnormal patterns in the data, the device can filter these and provide a notification to the user. This improves the user experience as there is no need to wait for the full processing time in case of a flagged scan and need for a rescan of the object.

The image scale data can be determined based on a variety of properties of the device capturing the image, the motion of the device, and the height from which the image was taken. Calculating the scale data can include regularizing the signals from the inertial measurement units as sampling rates, error rates, noise, and the like are not consistent across different makes and models of devices. Regularizing the signals can include transforming the signals to a common sample rate, determining minimum and maximum values for the signals, and/or filtering noise from the measured signals. Height can be determined based on the path of the device as determined by physical simulation models and the signals. The models can be refined to correct for drift and/or errors in the signals. The results of the physical model and the physically fixed model, along with metadata from the scan conditions, can be provided to a machine learning classifier that produces a height fix estimation. The usage of machine learning classifiers can improve the ability of the device to calculate the height as the machine learning classifier is well suited to correcting for errors and/or differences between different makes and models of devices. For example, different devices may have different camera sensors and lenses. For this reason, knowing the height from which a scan was taken, together with the exact device allows the machine learning classifier to translate this height into an image scale with a high degree of accuracy. A variety of processes for capturing image data in accordance with aspects of the disclosure are described with respect to FIG. 3B. A variety of processes for predicting height information and determine scale data for images in accordance with aspects of the disclosure are described with respect to FIG. 5.

At step 320, model data can be generated. The model data can be generated based on the image data and the height data. In several embodiments, the model data is generated based on mesh models of the objects in the image determined using the depth sensors of the mobile device. The inertial measurement data and/or device data can be used to straighten and/or correct any perspective in the captured image. This correction can aid in achieving optimal measurements and/or to neutralizing any effects coming from the position or angle of the device during the capture. In many embodiments, a transformation matrix can be calculated and/or used to correct the image.

A bounding box can be determined in the image to identify where the objects are located in the image. The bounding box can be used to reduce the portion of the image to be processed during object detection. One or more objects can be detected within the image. In several embodiments, the objects are detected using a machine learning classifier trained to identify the class of object. For example, a deep learning neural network can be trained to classify the results of the bounding box and classify whether it sees two feet in the correct position, whether it is something else or any of specific notifications for the user such as barefoot, shoes, or wrong postures. This can also be used to validate that the scan taken is correct and can be used to measure all feet dimensions. Lines can be determined within the image. The line can identify a delineation between a wall and a floor in the captured image. For example, a single image may not capture the full shape of the heel and the toe box of the foot and a reference object can be used to determine the exact starting point where the foot is positioned. In a number of embodiments, the reference object is a wall.

In many embodiments, the model data can be generated based on information captured using one or more depth sensors, such as LIDAR sensors. The depth sensors can be used to determine the height with respect to one or more portions of the captured objects in the image data. This fine-grained height information for different portions of the objects can be used to calculate volume (e.g. 3D volume)

and/or circumferences for the objects as appropriate. Additionally, the differences in height between different portions of the object can be used to determine the shape of the object and/or delineations between the captured object and reference objects, such as a floor or wall.

In a variety of embodiments, the model data can be generated based on a mesh model of the object. A mesh model of the object can be determined based on one or more beams and/or dots projected onto the object by the depth sensor. The beams and/or dots can be connected to generate the mesh model of the object. In several embodiments, an application programming interface (API) provided by the operating system of the device capturing the image can provide the mesh model of the object.

The object can be segmented from the image. In several embodiments, the segmentation of the object is pixel-perfect. Given the wide variety of settings and combinations in which the images are captured, it is extremely important for the accuracy of the processes to separate the objects from the background precisely. Given lighting and contrast conditions that may become harsh in some environments, this task is sometimes hard. To achieve maximal accuracy, the objects should be parallel to each other and/or perpendicular to the reference object. If this is not the case and the user is standing in a very wrong position, a notification can contextually flag this and not allow for the scan to be completed. However, when posture is only slightly off, the orientation of the objects can be corrected before measurements are taken. The measurements of the object can be calculated based on the pixels in the segmented object and the image scale data. A mesh model of the object can be used to assist in the determination of the edges of the object in the captured image as appropriate.

The model data can include the object, the measurements of the object, a mesh model of the object, and/or a variety of other data regarding the object as appropriate. The model data can be generated for one or more objects in the image. The model data can include a variety of measurements and/or models of the captured object. For example, when the captured objects include feet, a variety of measurements such as foot length, width, toe length, diagonal width, volume of the toe-box compared to the total area of the foot, and the length to width ratio, can be calculated and included in the model data. In addition to metrics that are calculated for each foot separately, there are measurements that compare the two feet to generate metrics such as differences between the sizes of each foot. These measurements can be used to determine accurate sizing for footwear on a per-foot basis. For example, anatomical information together with the data from the shoes styles, categories and data from other athletes as well as preferences to generate size recommendations for the feet modeled in the model data. A variety of processes for generating model data in accordance with aspects of the disclosure are described with respect to FIG. 6.

Capturing Images of Objects

Figure 3B:
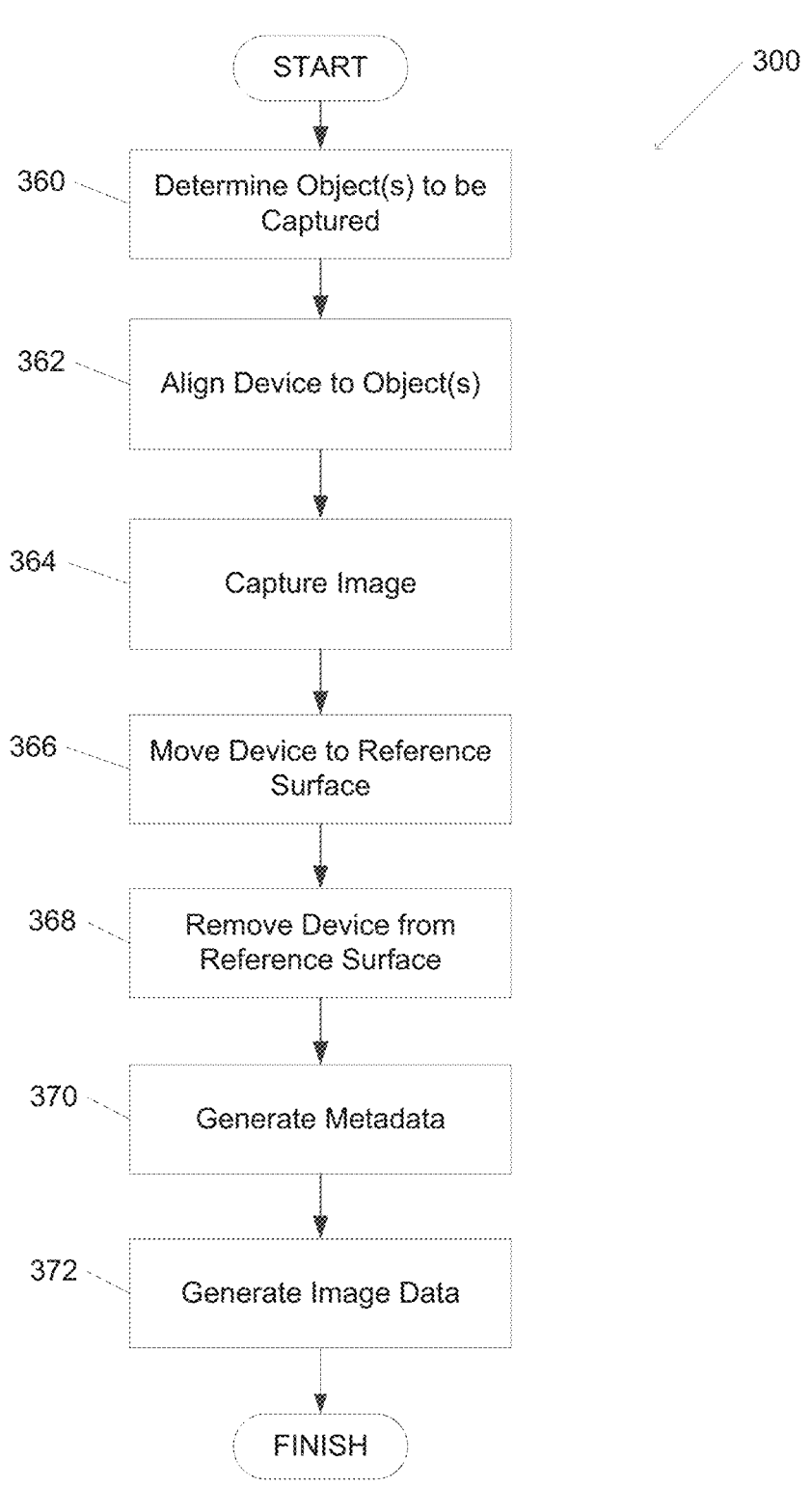
FIG. 3B is a flow chart conceptually illustrating a process for capturing an image of one or more objects in accordance with one or more aspects described herein.
Figure 4C:
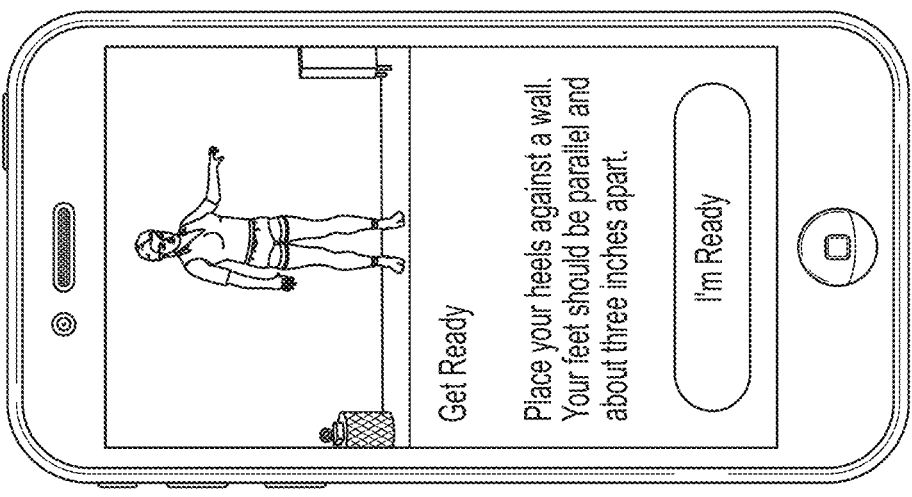
FIGS. 4A-F are screenshots of user interfaces for capturing an image in accordance with one or more aspects described herein.
Figure 4B:
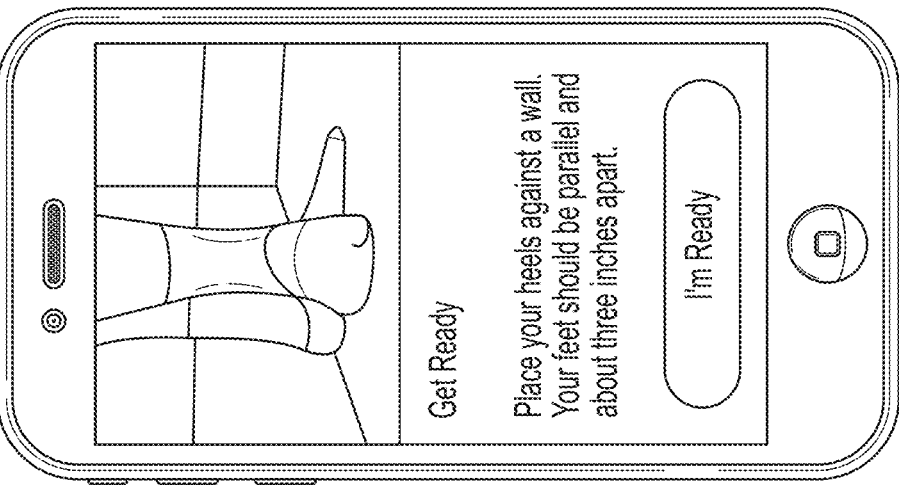
Figure 4A:
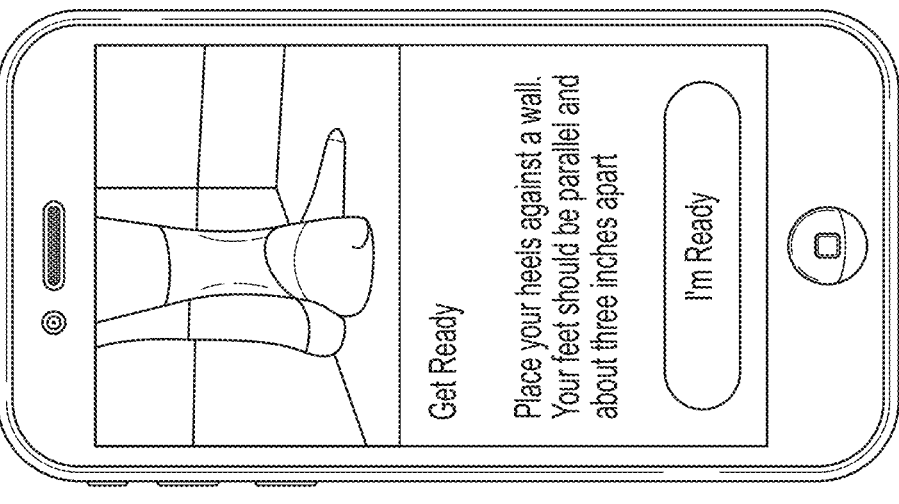
Figure 4F:
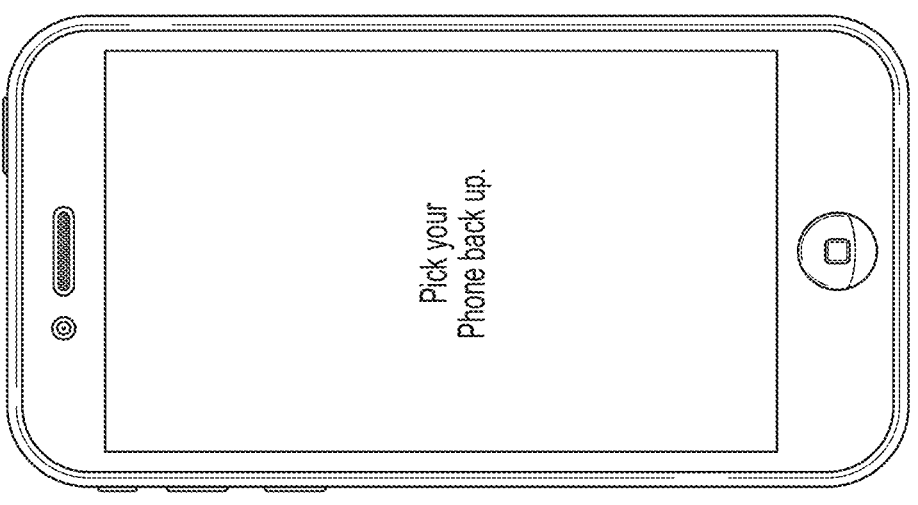
Figure 4E:
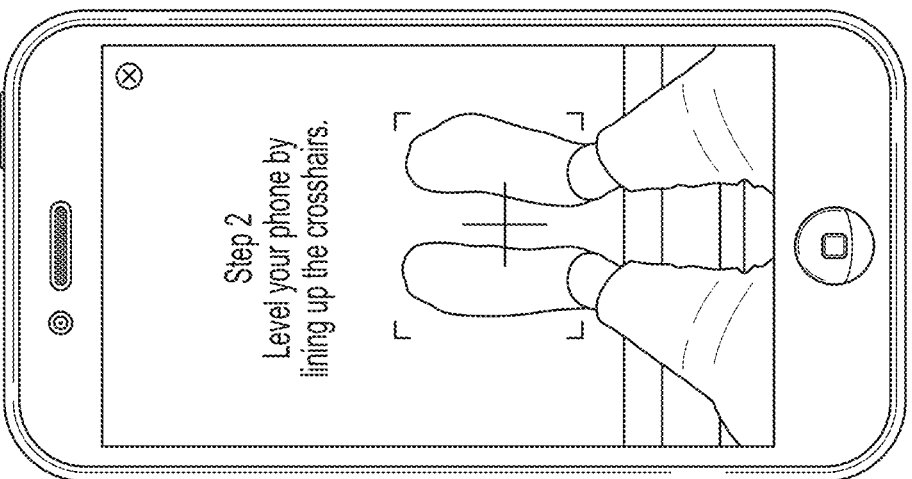
Figure 4D:
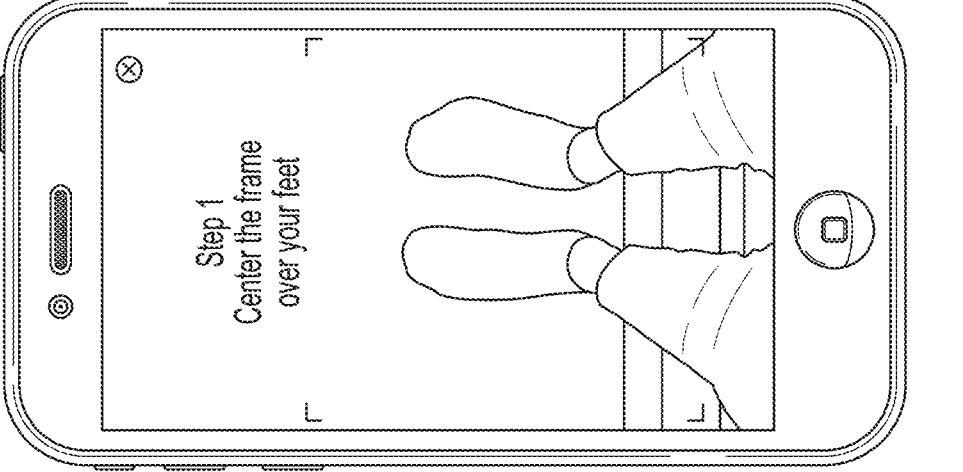

FIG. 3B is a flow chart conceptually illustrating a process for capturing an image of one or more objects in accordance with one or more aspects described herein. Some or all of the steps of process 350 may be performed using one or more computing devices as described herein. In a variety of embodiments, some or all of the steps described below may be combined and/or divided into sub-steps as appropriate.

At step 360, objects to be captured can be determined. In several embodiments, the object to be captured can be framed using an image capture application executing on a mobile device. The object(s) to be captured can be any object to be measured and/or modeled. In a variety of embodiments, the object can include a user's feet. An image capture application can provide a variety of instructions regarding how to orient the mobile device relative to the target object and/or move the mobile device through space. For example, the instructions can include a series of steps that include an explanation of the image capturing object, instructions for preparing the object for capture, placing the object against a reference plane, ensuring that the object is oriented in a defined direction, centering the object within an image capture window, leveling the mobile device, moving the mobile device to the reference plane, and removing the mobile device from the reference plane using a series of user interfaces provided by a mobile device. FIGS. 4A-F are screenshots of user interfaces for capturing an image in accordance with one or more aspects described herein. A variety of machine learning classifiers can be used to automatically advance between user interface steps and/or dynamically instruct users to improve the orientation of the mobile device to the object to be captured.

At step 362, a device can be aligned to an object. The device can be aligned to the object such that the object appears in a consistent location in the captured image. For example, the image of the object can be captured using a mobile device. However, camera locations can vary between mobile devices. Therefore, the location of the mobile device relative to the object needs to be adjusted based on the dimensions of a particular mobile device. In many embodiments, an image capture application executing on the mobile device can present a frame that shows where the object is relative to the mobile device and/or provides contextual instructions (and/or other visual indications) that guide the proper alignment of the mobile device relative to the object.

In several embodiments, the mobile device provides a live preview of the object and a variety of classifiers can be executed against the live preview to determine if the mobile device and object are properly aligned. A variety of processes for determining correct alignment that can be used in accordance with embodiments of the invention are described in more detail with respect to FIG. 6.

The device capturing the object can also be aligned in space. In several embodiments, aligning the object in space includes determining that the mobile device is level. For example, the image capture application can present a crosshair element showing the orientation of the mobile device in space as measured by an accelerometer and/or gyroscope located in the mobile device. The accelerometer can measure the movement of the mobile device alone one or more axes and the gyroscope can measure the orientation of the mobile device in space.

At step 364, an image can be captured. The captured image can include the object and one or more reference planes. In several embodiments, two crosshairs can be shown, where the first crosshair is dotted and is in a constant place. The second crosshair can be a full line and move according to the angle of the mobile device in space. When the pitch and roll angles come close to zero and/or are under a specified threshold, the crosses align and an animation appears while the mobile device remains stable. One or more images of the object can be captured while the crosshairs are aligned. In a variety of embodiments, the image capture can be interrupted and/or restarted if the mobile device moves out of position in space and/or with respect to the object.

At step 366, the device can be moved to a reference surface. In several embodiments, metadata associated with the captured image can include a measurement of how far the device capturing the image is from the reference surface.

Moving the device to the reference surface can allow for a measurement of the distance from the device to the reference surface using a variety of sensors, such as accelerometers, gyroscopes, magnetometer, and the like. The data captured during the movement of the device can be used to calculate the height from which the image was taken and the movement graph of the device during the movement to the reference surface. The data can be captured at a sampling rate, such as 100 hertz, until the device stops moving when it reaches the reference plane. Each sensor may capture data at the same and/or different sampling rates. A variety of contextual messages can be provided during the movement of the device such as, but not limited to, identifying when the device begins to move and when it has reached stability, measuring basic times for movement, landing, etc. that allow flagging unusual behavior, and identifying upward moving indicating the instructions are not being followed.

At step 368, the device can be removed from the reference surface. Once the device is at rest on or near the reference surface, the device can be picked up. In several embodiments, a user interface can be presented to instruct a user to pick up the device once it has reached the reference surface. During that time, all the data can be compressed and/or sent to a processing server system. Additionally, the device can identify and/or filter any abnormal patterns in the data. A notification can be provided indicating that abnormal data has been identified and causing recapture of the image.

At step 370, metadata can be generated. The metadata can include any of the data measured during the movement of the device to and from the reference surface as described herein. The metadata can also include a description of the movement of the device. The movement of the device can be used to recreate the slope in which the device has moved through the air during the image capture, which can be used to calculate the height and position in which the device was during the image capture. In several embodiments, the height is calculated using a physical simulation and/or machine learning classifiers as described herein. The height can be used to generate a scale for the captured image as described in more detail with respect to FIG. 5.

At step 372, image data can be generated. The image data can include the image of the object and/or the metadata. In several embodiments, the image data and/or metadata can be stored in a file format incorporating all of the relevant information, including physical properties and personal preferences, to represent a user and help the user perform personalized custom or non-custom shopping for clothing, eyewear, footwear, or other body related products.

Figure 5:
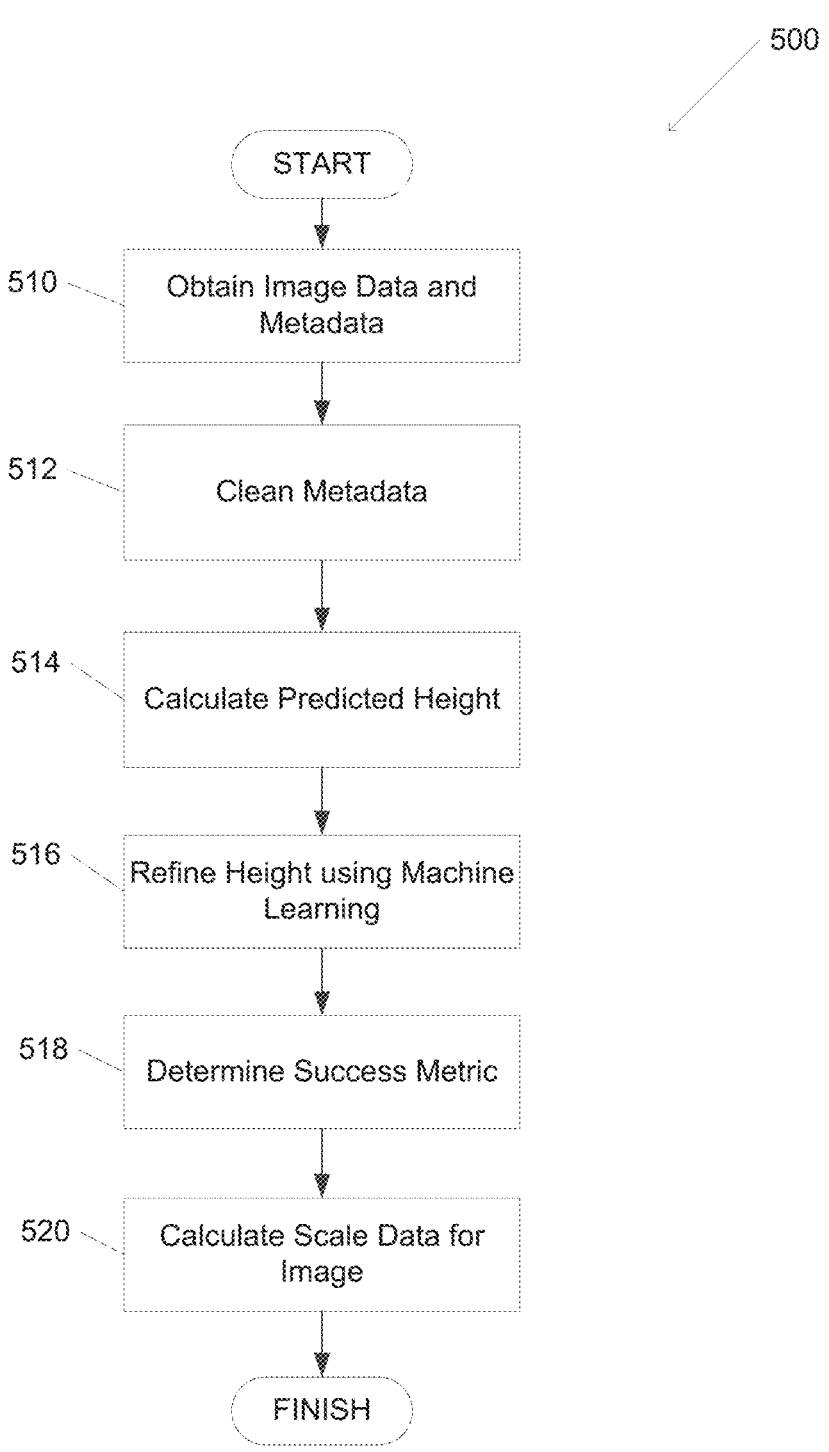
FIG. 5 is a flow chart conceptually illustrating a process for determining a scale for an image in accordance with one or more aspects described herein.

FIG. 5 is a flow chart conceptually illustrating a process for determining a scale for an image in accordance with one or more aspects described herein. Some or all of the steps of process 500 may be performed using one or more computing devices as described herein. In a variety of embodiments, some or all of the steps described below may be combined and/or divided into sub-steps as appropriate.

At step 510, image data and metadata can be obtained. The image data can include an image of an object taken from a particular location and/or a variety of sensor information describing the orientation and movement of the device capturing the image data as described herein. In a number of embodiments, the metadata includes data provided from a mobile device including, but not limited to, accelerator, gyroscope, and magnetometer, each in 3 axes, as well as depth data and/or temperature data. The depth data can include depth determined using a variety of depth sensors, such as infrared sensors, light detection and ranging (LIDAR) sensors, and the like. In addition, the metadata can include events occurring during the image capture by the mobile device, such as user interface interactions, time data indicating when the image was taken, when the mobile device reaches the reference surface, the time the mobile device is removed from the mobile device, etc. Additionally, the metadata can include a variety of data describing the mobile device including, but not limited to, make, model, operation system version, camera identification data, sensor identification data, internet protocol data, and the like.

At step 512, the metadata can be cleaned. Cleaning the metadata can include filtering noise in the captured data and/or regularizing the data to a common sampling rate. In several embodiments, cleaning the metadata includes processing data based on the particular sensor used to capture the data. For example, particular makes and models of sensors may have pre-defined characteristics, such as particular levels and/or patterns of noise in the data measured using that sensor. These characteristics can be used to normalize the data captured using that sensor to remove the noise expected from that make and/or model of sensor. Various methods can be used for cleaning the data, such as Fourier transformations, as appropriate to the specific type of data being manipulated. Additionally, the metadata can be cleaned and/or filtered based on known actions during the image capture process. For example, when the mobile device is resting on the reference surface, the height relative to the object and the velocity of the device are both zero. Additionally, the velocity of the mobile device at the time the image is captured is approximately zero.

Figure 7B:
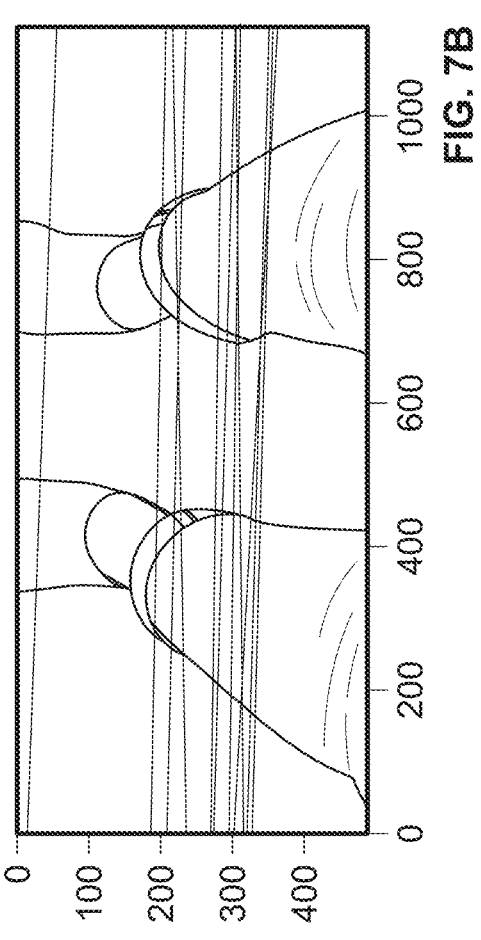
FIGS. 7A-C are screenshots of features within an image in accordance with one or more aspects described herein.
Figure 7C:
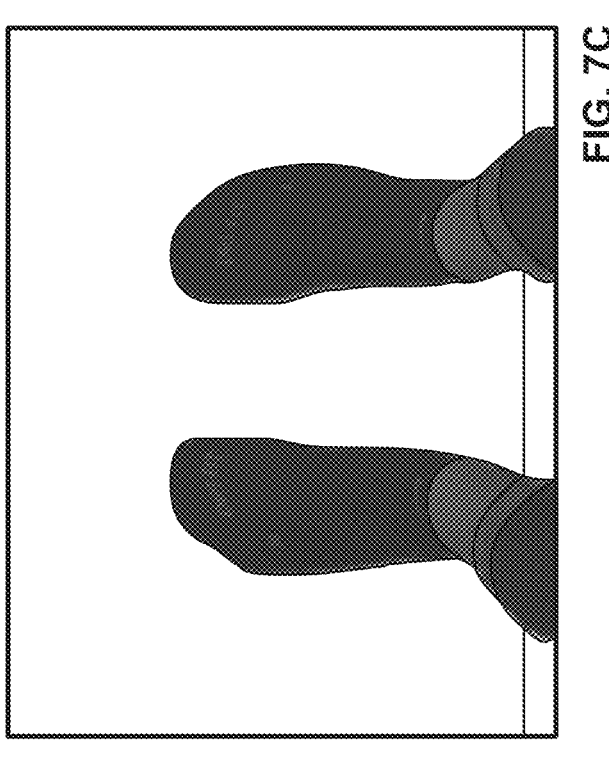
Figure 7A:
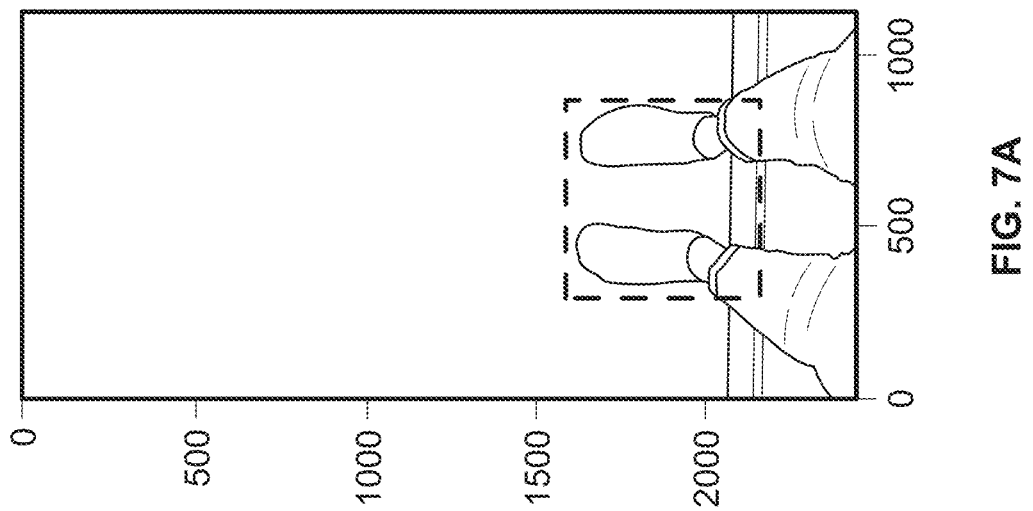
Figure 7D:
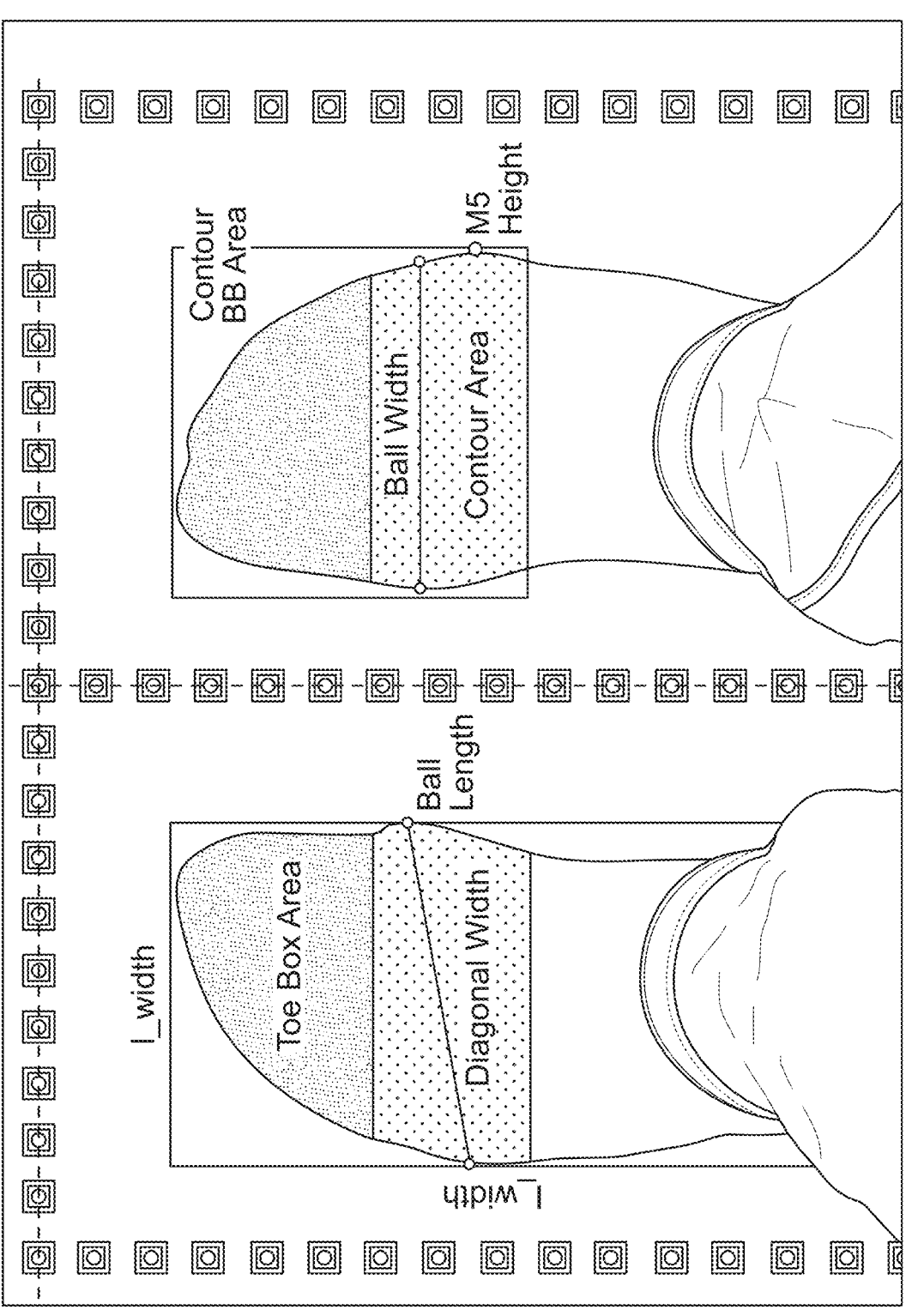
FIG. 7D is a conceptual illustration of measurements of an object in accordance with one or more aspects described herein.
Figure 7F:
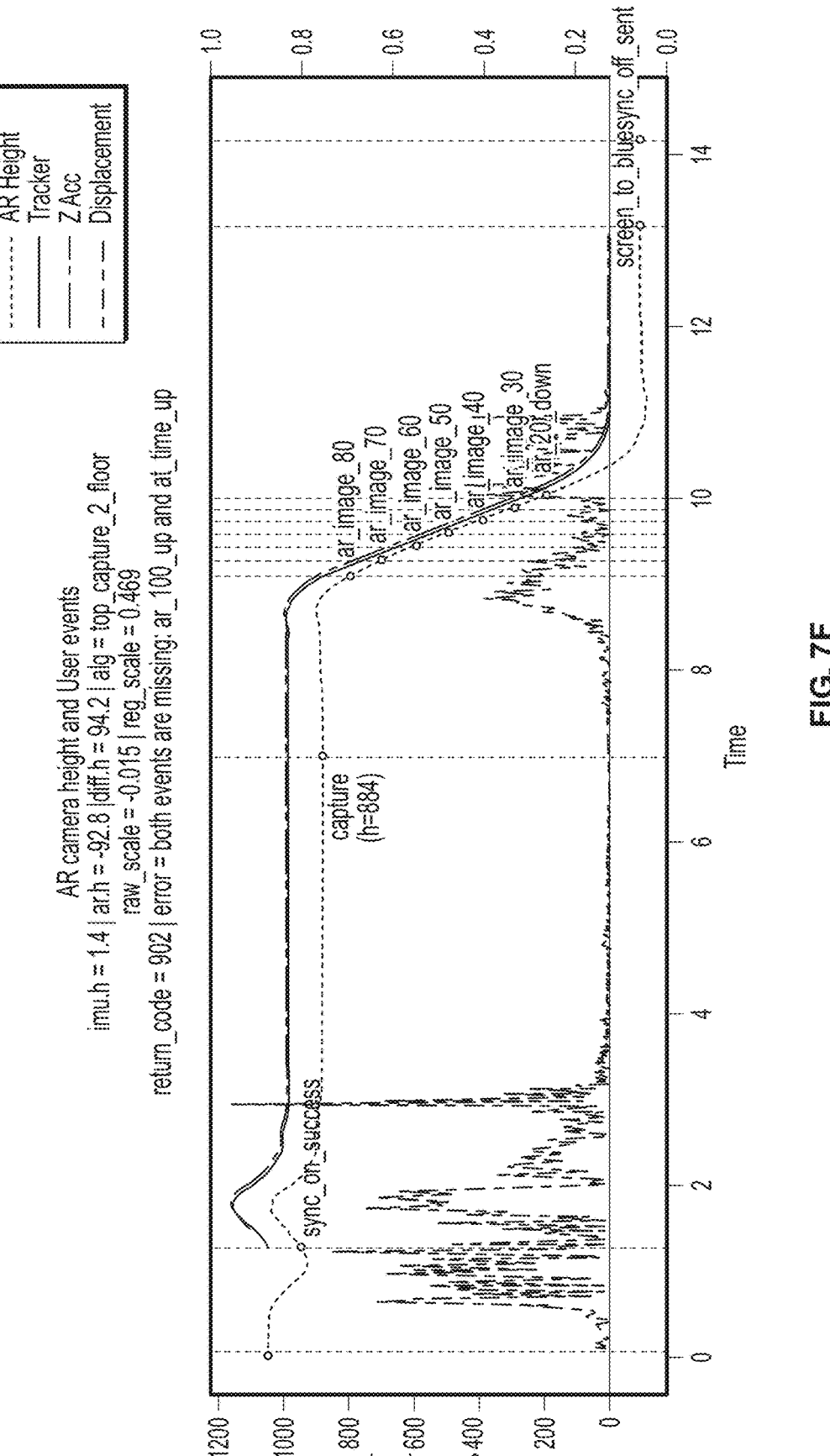
FIG. 7F is a conceptual illustration of height predictions based on the movement of a mobile device in accordance with one or more aspects described herein.

At step 514, a predicted height can be calculated. The height can be a measure of the position of the mobile device at the time of capture. The predicted height can be calculated using physical simulation models. For example, by double integrating the acceleration in each one of the axes, the velocity and displacement path throughout the movement of the mobile device can be calculated. This time series of data can be refined using the acceleration and/or other raw data in the metadata to resolve potential drifts in the measurements. For example, the acceleration and velocity data series can be manipulated to optimize the results to fit the expected trends, such as no acceleration at the beginning and end of the movement of the mobile device, zero velocity when the mobile device is laying on the reference plane, and the like. FIG. 7F is a conceptual illustration of height predictions based on the movement of a mobile device in accordance with one or more aspects described herein.

At step 516, the predicted height can be refined. The predicted height can be refined by one or more machine learning classifiers. The machine learning classifiers can be trained to identify and correct errors in physical models based on a variety of features such as, but not limited to, camera parameters, aberrations in camera lenses, and any other issues that can be specific to the capturing of images for particular makes and models of mobile devices. The features can also include internet protocol address, media access control access address, mobile phone type, mobile phone build date and/or version, operating system version, and/or any other data that can be used to identify properties of the mobile device and/or characteristics of images captured by the mobile device. The machine learning classifiers can use the physical model of the predicted height and/or the metadata to calculate a refined height and a confidence metric indicating the likelihood that the refined height corresponds to the ground truth height for the image. In many embodiments, the predicted height can be refined based on one or more height measurements determined using a depth sensor, such as a LIDAR sensor. In a number of embodiments, the predicted height can be averaged with one or more heights determined using the depth sensor to refine the predicted height.

It should be readily apparent to one having ordinary skill in the art that a variety of machine learning classifiers can be utilized including (but not limited to) decision trees, k-nearest neighbors, support vector machines (SVM), neural networks (NN), recurrent neural networks (RNN), convolutional neural networks (CNN), and/or probabilistic neural networks (PNN). RNNs can further include (but are not limited to) fully recurrent networks, Hopfield networks, Boltzmann machines, self-organizing maps, learning vector quantization, simple recurrent networks, echo state networks, long short-term memory networks, bi-directional RNNs, hierarchical RNNs, stochastic neural networks, and/or genetic scale RNNs. In a number of embodiments, a combination of machine learning classifiers can be utilized, more specific machine learning classifiers when available, and general machine learning classifiers at other times can further increase the accuracy of predictions.

At step 518, a success metric can be determined. The success metric can indicate the likelihood that the refined height corresponds to the ground truth height for the image. The success metric can be determined based on a rule-based analysis of the metadata and/or the confidence metric generated by the machine learning classifier. The rule-based analysis can include processing various parameters from the metadata (such as the acceleration, timing of each phase, angles of the phone, etc.) and flagging when one or more of the parameters exceeds a threshold value for the parameter.

Figure 7G:
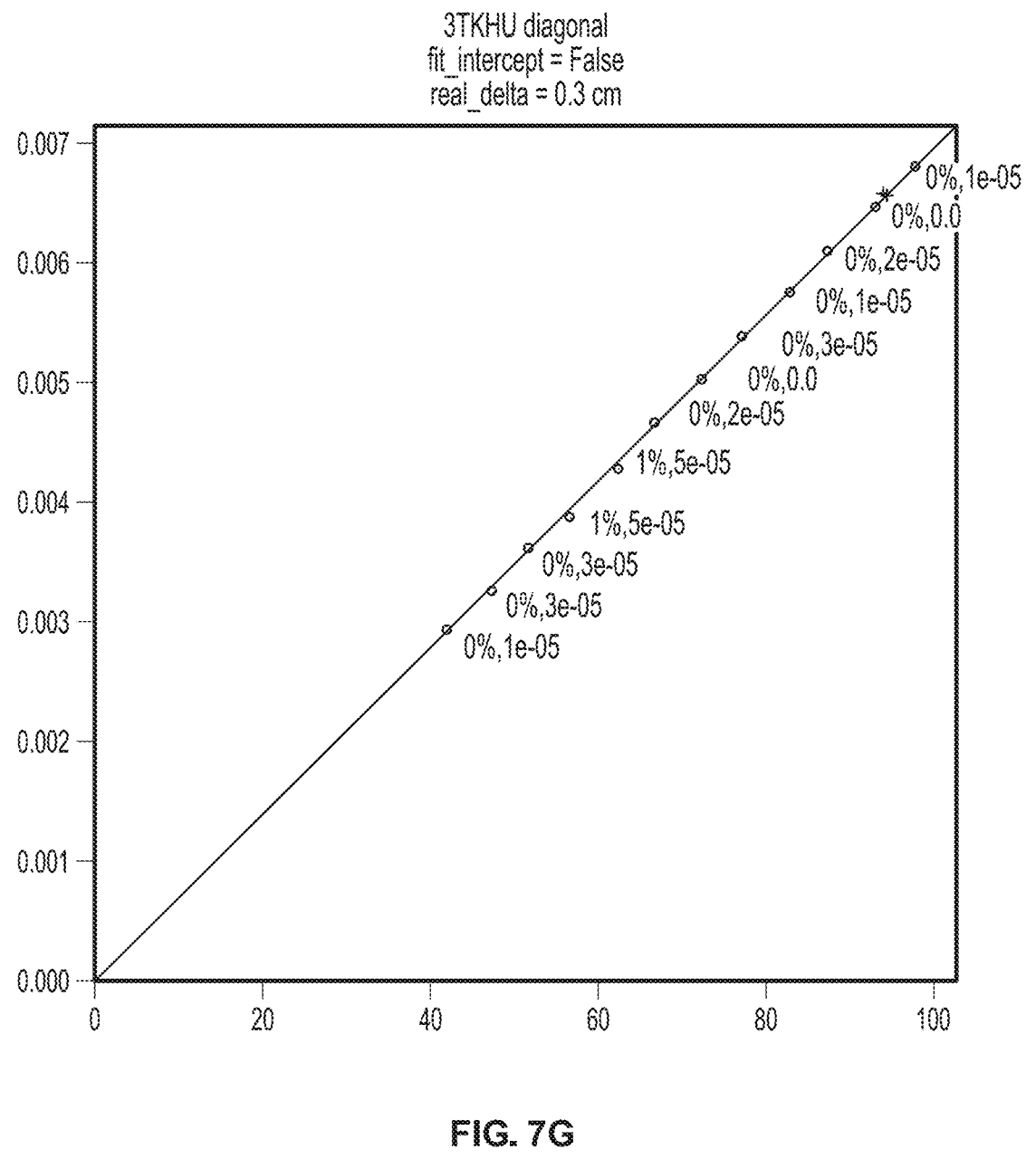
Figure 7H:
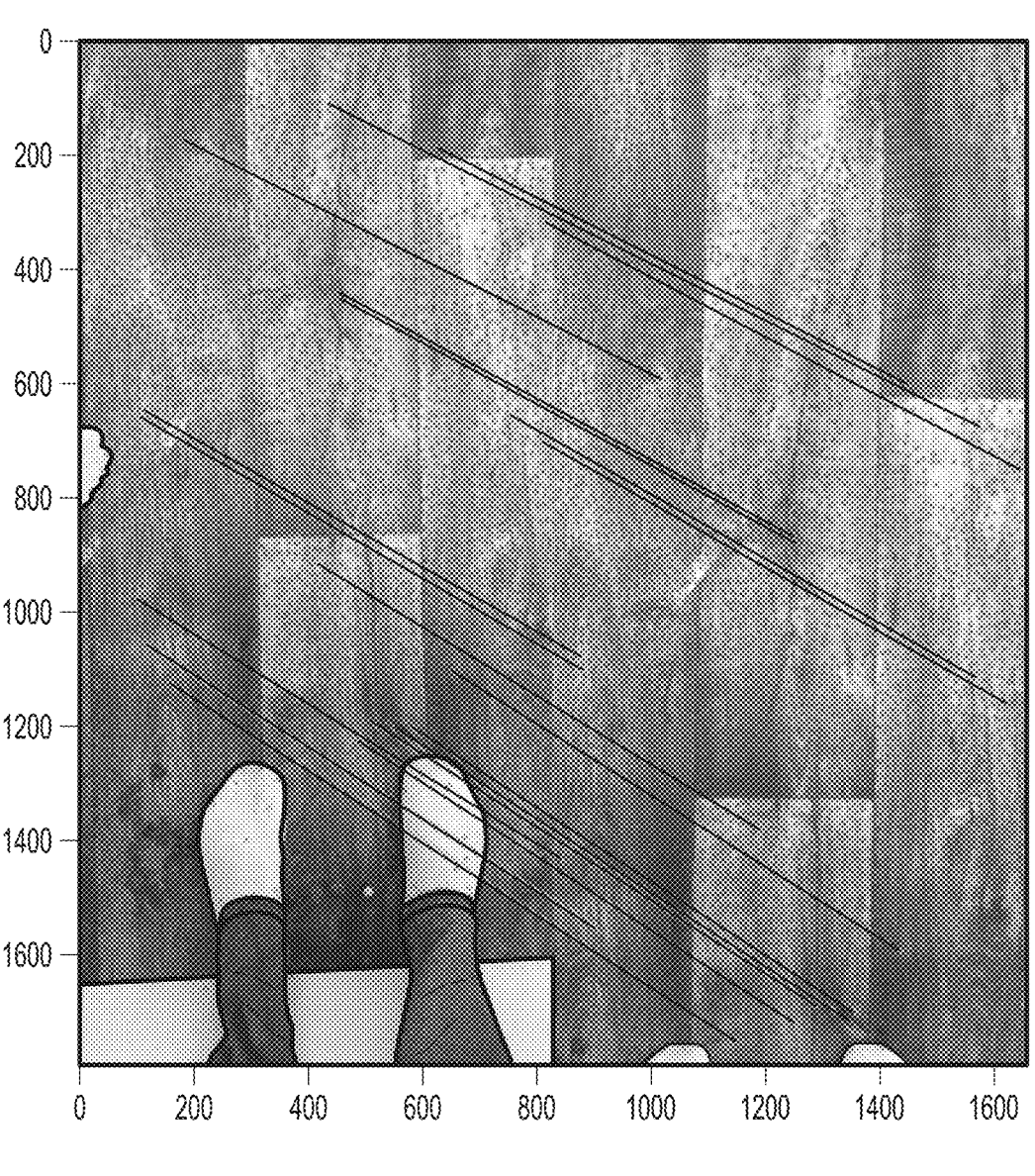

At step 520, scale data can be calculated for the image. The scale data can be a metric that can be used to calculate a real world size for an object in an image based on the number of pixels in the image. In many embodiments, the scale data indicates a pixel-to-millimeter ratio for the image. The scale data can be calculated based on the refined height data along with the metadata if necessary. As each mobile device includes different camera sensors and lenses, the scale metric for a particular image can depend on both the height and the characteristics of the mobile device capturing the image. In a variety of embodiments, the height data and metadata are used as inputs to a model that converts height data to a pixel-to-millimeter measurement. FIGS. 7G-H are conceptual illustrations of a scale generated for an image in accordance with one or more aspects described herein.

Figure 6:
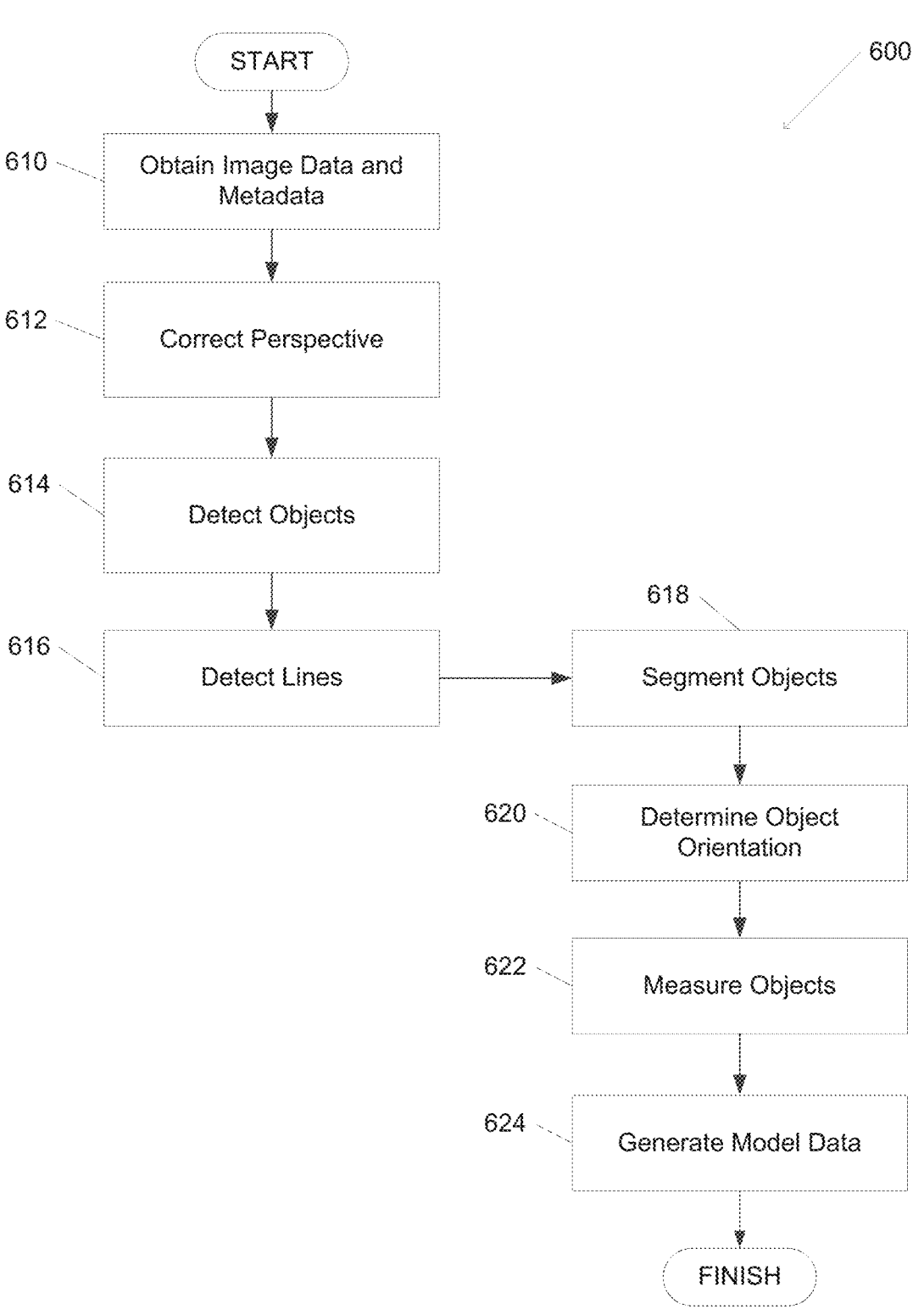
FIG. 6 is a flow chart conceptually illustrating a process for detecting objects in an image in accordance with one or more aspects described herein.

FIG. 6 is a flow chart conceptually illustrating a process for detecting objects in an image in accordance with one or more aspects described herein. Some or all of the steps of process 600 may be performed using one or more computing devices as described herein. In a variety of embodiments, some or all of the steps described below may be combined and/or divided into sub-steps as appropriate.

At step 610, image data and metadata can be obtained. The image data and metadata can be obtained as described herein. The image data can include one or more objects to be detected. Once detected, the objects can be measured using scale data calculated for the image data. The scale data can be stored using the metadata.

At step 612, a perspective can be corrected. The image data can be captured from a particular perspective, which can be affected by the physical characteristics of the camera and/or lenses used to capture the image and/or the orientation of the mobile device in space. The image can be straightened and corrected to improve the height measurements by limiting the effect coming from the position or angle of the mobile device during the capture of the image. The metadata, including the specifications of the mobile device used for the capture and the properties of the camera, such as the field of view and focal length, can be used to generate a transformation matrix. The transformation matrix can be applied to the image to flatten the image and remove any perspective effect.

At step 614, objects can be detected. The objects can be detected in the image data. In a variety of embodiments, a machine learning classifier can be used to determine a bounding box for one or more objects in the image. The machine learning classifier can be trained to detect a particular class of object in a variety of conditions, including combinations of light, floor and room conditions as well as skin color variations, shoe types and/or postures. For example, a deep learning neural network can be used to detect two socked feet and create a bounding object around them. The bounding object can include the coordinates of corners of the bounding object that surrounds the object. A bounding box determined within an image in accordance with one or more aspects of the invention is shown in FIG. 7A.

At step 616, lines can be detected. The lines can identify where in the image one or more reference planes intersect. For example, for an image where a user stands against a wall to take an image of their feet, the lines can identify where the floor (e.g. the first reference plane) intersects the wall (e.g. the second reference plane). This can be used to aid in determining the starting point of the object within the image. Returning to the previous example, the intersection of the wall and floor can be used to determine where the heel of the foot is located as the foot was positioned at the intersection of the wall and floor. In many embodiments, the location of one or more of the reference planes can be determined using a depth sensor, such as a LIDAR sensor. The depth sensor can project one or more beams or dots into the image and the shape of the reference planes can be determined based on the beams or dots. For example, a reference plane, such as a floor or wall, is typically very flat as compared to the objects within the scene. The flatness (e.g. lack of contours) of an object can be determined based on the beams or dots, and the flattest of the objects within the scene can be determined to be the reference object(s) in the image.

In several embodiments, a three-step process can be used to identify lines within an image. The first step can include using edge detection techniques to identify line candidates in the correct area on the image. A set of validations can be used to screen the line candidates based on known physics and the setting and posture. In many embodiments, posture can be determined based on depth information captured using a depth sensor. The second step can include using a machine learning classifier to determine confidence metrics for each of the line candidates. The confidence metric can be used to determine the line candidate that is most likely to identify the true intersection of the reference planes. The third step can include adjusting the position of the selected line candidate to a pixel perfect fix representing the line for maximal accuracy. This can be performed using edge detection techniques and/or machine learning classifiers as appropriate. A set of line candidates determined within an image in accordance with one or more aspects of the invention are shown in FIG. 7B.

At step 618, objects can be segmented. Segmenting the object from the image can include identifying the pixels that constitute the object within the image. Given the wide variety of settings and combinations in which the images are captured, the accuracy of which the contours of objects within the image is important to ensuring accuracy of the object measurements. In a number of embodiments, the contours of the objects can be determined based on a depth map generated using a depth sensor. In many embodiments, a three-step process can be used to segment objects in an image. In the first step, a machine learning classifier can be used to generate a heat map marking the foreground objects from the background in the image. The second step can include validating the heat map to ensure that the portions identified as foreground objects are correct. Once validated, a binary mask can be generated to remove the background portions from the image. The third step includes using the binary mask and image data to determine the precise edges of the objects to include all pixels belonging to the object and no pixels that are part of the background. For example, the objects in the image can be feet and the background can include the floor and shadows being cast from the user's legs. An illustration of a segmented object in an image in accordance with one or more aspects of the disclosure is shown in FIG. 7C. In a variety of embodiments, an object tracking and segmentation application programming interface (API) provided by the operating system of the capture device can be used to segment the objects. In many embodiments, the object segmentation provided via the API can be combined with the object segmentation based on the binary mask to further refine the edges of the objects in the captured image.

At step 620, object orientation can be determined. The orientation of an object can be determined with respect to other detected objects and/or to a reference plane in the image. When multiple objects are present, the orientation of the object can be aligned so that the objects are parallel. In several embodiments, the objects can be moved or otherwise rotated so that they are perpendicular to a reference plane. For example, if an image contains two feet objects, the orientation of each foot object can be adjusted such that they are parallel to each other and perpendicular to a wall reference plane. In many embodiments, the shape and trends of the binary mask can be used to find a position representing a substantially perpendicular posture.

At step 622, objects can be measured. The detected objects can be measured based on the scale data for the image. The objects can be measured along any dimension by multiplying the number of pixels in the desired measurement by the scale. For example, when the detected object is a foot, a variety of properties of the foot can be calculated. These properties include, but are not limited to, foot length, width, toe length, diagonal width and more. A variety of relative measurements, such as the volume of the toe-box compared to the total area of the foot and the length to width ratio, can also be measured. Conceptual illustrations of measurements of a foot that can be used in accordance with one or more aspects of the disclosure are shown in FIG. 7D. When multiple objects are detected, measurements that compare multiple objects can also be calculated. In several embodiments, the objects can be measured based on depth information provided by a depth sensor, such as a LIDAR sensor. The depth sensor can be used to determine specific contours of the captured object and these contours can be used to fine-tune the dimensions of the objects. The use of the depth information can improve the calculation of a variety of properties of the object, such as volume and circumference of the object.

A table of foot measurements that can be calculated in accordance with one or more aspects of the disclosure are shown in FIG. 7E. Each of the measurements can be calculated based on a model generated on various foot models for different genders, geographic locations, and/or ages. In several embodiments, the foot measurements are generated using a machine learning classifier.

At step 624, model data can be generated. The model data can include the detected objects along with the image data, the metadata, and/or the calculated measurements as appropriate. The model data can include 2D models, 3D models, mesh models, and/or any other model of the detected object (s) as appropriate. In a number of embodiments, the model data can be generated using a file format compatible with a three dimensional modeling program, such as a STL file, and/or a digital cutting device, such as DXF and/or DWG files. However, it should be noted that any file format can be used to store the model data as appropriate. The model data can be used to provide a variety of product recommendations and/or fabricate custom products as described with respect to FIG. 8.

Providing Recommendations

A variety of recommendations can be made based on anatomical information described in model data together with the data from shoes styles as well as user preferences to generate size recommendations for particular products. For example, a user preference can include preferred styles, shoe types, and colors, such as a blue or grey athletic shoe. A product database can include, for example, an athletic shoe in colors blue, black, and red. A recommendation can be made for the athletic shoe in the proper size (calculated based on the model data) and blue color (determined based on the user's preferences). In a variety of embodiments, recommendations can be made to automatically fabricate custom products, such as custom footwear and custom orthotics, based on the model data. The size of the custom product can be determined based on the model data, while the style and/or color of the custom product can be determined based on the preference data. In this way, the recommended product can be constructed in accordance with user specific or customized requirements.

Figure 8:
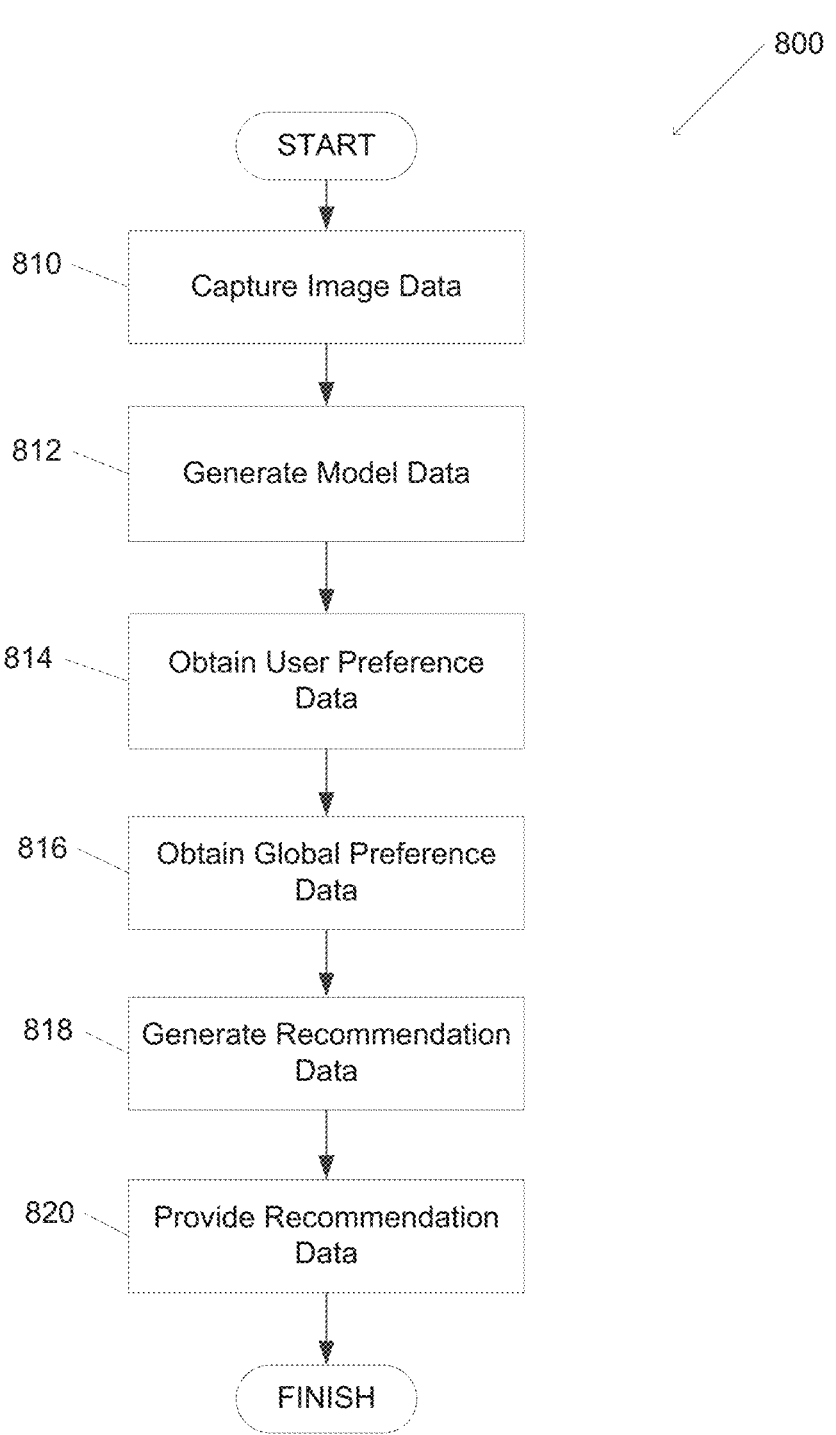
FIG. 8 is a flow chart conceptually illustrating a process for providing recommendations in accordance with one or more aspects described herein.

FIG. 8 is a flow chart conceptually illustrating a process for providing recommendations in accordance with one or more aspects described herein. Some or all of the steps of process 800 may be performed using one or more computing devices as described herein. In a variety of embodiments, some or all of the steps described below may be combined and/or divided into sub-steps as appropriate.

At step 810, image data can be captured. At step 812, model data can be generated. The image data can be captured and the model data can be generated as described herein.

At step 814, user preference data can be obtained. The user preference data can include any preference that the user has for one or more products. This can include, but is not limited to, style, shape, color, and the like.

At step 816, global preference data can be obtained. The global preference data can include preference data for multiple users. The global preference data can also include measurement data and/or model data associated with the preferences for the users.

At step 818, recommendation data can be generated. The recommendation data can include one or more products determined based on the preference data, the model data, and/or the global preference data. The products can be determined based on the preference data and/or global preference data for those users having measurements and/or model data similar to the obtained model data. The size of the recommended products can be determined based on the model data. The style, shape, color, etc. of the recommended products can be determined based on the preference data. In a variety of embodiments, the recommendation data is generated using a machine learning classifier that determines potentially matching products along with a confidence metric indicating the likelihood that the user will like and/or purchase the recommended product.

At step 820, recommendation data can be provided. In several embodiments, the recommendation is provided within an application executing on the mobile device used to capture the image data. In a variety of embodiments, the recommendation data can be used to order the recommended product from an online store. In many embodiments, the recommendation data can be used to manufacture the recommended product such that the product is a one-off customized product for the user. The model data can be provided directly to a manufacturing device, such as a 3D printer, to manufacture the personalized product.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied, in whole or in part, in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive.

What is claimed is:

1. A method for generating a model of an object, comprising:

capturing, by a mobile device, an image comprising an object and a reference object;

determining, by the mobile device, from a plurality of candidate lines and corresponding confidence metrics, a reference line identifying a location of the object and the reference object in the image;

segmenting, by the mobile device, pixels in the object in the image from pixels in the image outside the object, wherein segmenting pixels in the object in the image from pixels in the image outside the object includes applying a first machine learning classifier to generate a heat map marking a foreground including the object from a background in the image and generating a binary mask to remove the background from the image;

measuring, by the mobile device, the object based on the pixels in the object and based on determining scale data of the image, wherein the scale data is determined using a second machine learning classifier and metadata from the captured image and based on a predicted height of the mobile device calculated from at least one depth measurement; and generating, by the mobile device, model data comprising the object and measurements of the object.

2. The method of claim 1, further comprising generating, by the mobile device, a product size recommendation based on the model data.

3. The method of claim 1, further comprising:

determining, using a depth sensor in the mobile device, a depth measurement of the object; and correcting, by the mobile device and based on the depth measurement, a perspective of the model data.

4. The method of claim 1, further comprising determining, by the mobile device, that the mobile device is aligned with the object wherein determining that the mobile device is aligned with the object includes leveling the mobile device by alignment indicators on the mobile device.

5. The method of claim 1, further comprising generating image data based on the model data, the image data including model data of the object and metadata associated with one or more settings specific to a user.

6. The method of claim 1, wherein measuring the object includes:

calculating, by the mobile device and based on at least one depth measurement determined using a depth sensor in the mobile device, the predicted height of the mobile device when the image was captured.

7. The method of claim 6, wherein calculating the predicted height of the mobile device when the image was captured includes:

projecting one or more laser beams toward the object using the depth sensor, wherein the depth sensor includes a light detection and ranging (LIDAR) sensor;

detecting, by the LIDAR sensor, a reflected laser beam being reflected back to the LIDAR sensor;

determining a time duration between projecting the one or more laser beams and detecting the reflected laser beam; and calculating the predicted height based on the time duration.

8. The method of claim 6, wherein calculating the predicted height of the mobile device when the image was captured includes using the depth sensor to take a plurality of depth measurements, and averaging the plurality of depth measurements to calculate the predicted height.

9. The method of claim 6, wherein generating the model data includes generating one or more mesh models of the object based on projections onto the object from the depth sensor.

10. The method of claim 1, wherein determining the reference line identifying the location of the object and the reference object in the image includes projecting, by a depth sensor in the mobile device, one or more beams or dots onto the object and determining the reference line based on the one or more beams or dots.

11. The method of claim 1, wherein segmenting pixels in the object in the image from pixels in the image outside the object includes: validating the heat map to ensure that portions identified as the foreground are correct as a precursor to generating the binary mask, and providing an object tracking and segmentation application programming interface by the mobile device to refine designated edges of the object in the captured image in combination with the binary mask.

12. An apparatus comprising:
at least one image capture device;
a processor; and
memory storing computer readable instructions that, when executed, cause the apparatus to:
    capture an image comprising an object and a reference object;
    determine, from a plurality of candidate lines and corresponding confidence metrics, a reference line identifying a location of the object and the reference object in the image;
    segment pixels in the object in the image from pixels in the image outside the object, wherein segmenting pixels in the object in the image from pixels in the image outside the object includes applying a first machine learning classifier to generate a heat map marking a foreground including the object from a background in the image and removing the background from the image;
    measure the object based on the pixels in the object and based on determining scale data of the image, wherein the scale data is determined using a second machine learning classifier and metadata from the captured image and based on a predicted height of the at least one image capture device calculated from at least one depth measurement; and
    generate model data comprising the object and measurements of the object.

13. The apparatus of claim 12, further comprising at least one depth sensor that includes at least one of an infrared sensor, a light detection sensor, or a LIDAR sensor.

14. The apparatus of claim 12, further comprising a depth sensor, and wherein measuring the object includes:
    calculating, based on at least one depth measurement determined using the depth sensor, a predicted height of the apparatus when the image was captured.

15. The apparatus of claim 14, wherein calculating the predicted height of the apparatus when the image was captured includes:
    projecting one or more laser beams toward the object using the depth sensor, wherein the depth sensor includes a LIDAR sensor;
    detecting, by the LIDAR sensor, a reflected laser beam being reflected back to the LIDAR sensor;

determining a time duration between projecting the one or more laser beams and detecting the reflected laser beam; and
    calculating the predicted height based on the time duration.

16. The apparatus of claim 14, wherein generating the model data includes generating one or more mesh models of the object based on projections onto the object from the depth sensor.

17. The apparatus of claim 16, wherein generating the model data includes determining edge locations of the object based on the one or more mesh models.

18. The apparatus of claim 12, further comprising a depth sensor, and wherein generating the model data includes determining contours of the object based on a depth map generated using the depth sensor.

19. The apparatus of claim 12, further comprising a depth sensor, and wherein determining the reference line identifying the location of the object and the reference object in the image includes projecting, by the depth sensor, one or more beams or dots onto the object and determining the reference line based on the one or more beams or dots.

20. A method for generating a model of an object, comprising:
    capturing, by a mobile device, an image comprising an object and a reference object;
    measuring, by the mobile device, motion of the mobile device as the mobile device is moved toward a reference plane;
    detecting, by the mobile device, the object in the image;
    determining, by the mobile device, from a plurality of candidate lines and corresponding confidence metrics, a reference line identifying a location of the object and the reference object in the image;
    segmenting, by the mobile device, pixels in the object in the image from pixels in the image outside the object, wherein segmenting pixels in the object in the image from pixels in the image outside the object includes applying a first machine learning classifier to generate a heat map marking a foreground including the object from a background in the image and generating a binary mask to remove the background from the image;
    measuring, by the mobile device, the object based on the pixels in the object and based on determining scale data of the image; and
    generating, by the mobile device, model data comprising the object and measurements of the object and based on determining scale data of the image, wherein the scale data is determined using a second machine learning classifier and metadata from the captured image and based on a predicted height of the mobile device calculated from at least one depth measurement.

* * * * *